United States Patent
Maetani et al.

(10) Patent No.: US 11,777,362 B2
(45) Date of Patent: Oct. 3, 2023

(54) MOTOR AND ELECTRIC APPARATUS INCLUDING THE SAME

(71) Applicant: WOLONG ELECTRIC GROUP CO., LTD., Shaoxing (CN)

(72) Inventors: Tatsuo Maetani, Shaoxing (CN); Yoshinori Isomura, Shaoxing (CN); Feng Hu, Shaoxing (CN)

(73) Assignee: WOLONG ELECTRIC GROUP CO., LTD., Shaoxing (CN)

( * ) Notice: Subject to any disclaimer, the term of this patent is extended or adjusted under 35 U.S.C. 154(b) by 0 days.

(21) Appl. No.: 17/537,043

(22) Filed: Nov. 29, 2021

(65) Prior Publication Data
US 2022/0416610 A1 Dec. 29, 2022

(30) Foreign Application Priority Data

Jun. 25, 2021 (JP) ................................. 2021-105913

(51) Int. Cl.
| | |
|---|---|
| *H02K 5/16* | (2006.01) |
| *H02K 5/173* | (2006.01) |
| *H02K 1/276* | (2022.01) |
| *H02K 11/33* | (2016.01) |
| *F24F 1/0018* | (2019.01) |
| *H02K 7/08* | (2006.01) |

(52) U.S. Cl.
CPC ......... *H02K 5/1732* (2013.01); *F24F 1/0018* (2013.01); *H02K 1/2773* (2013.01); *H02K 7/083* (2013.01); *H02K 11/33* (2016.01); *H02K 2211/03* (2013.01)

(58) Field of Classification Search
CPC ..... F24F 1/0018; H02K 5/1732; H02K 11/33; H02K 1/2773; H02K 7/083; H02K 2211/03
USPC .......................................................... 310/90
See application file for complete search history.

(56) References Cited

FOREIGN PATENT DOCUMENTS

| CA | 2838078 | * | 2/2019 | ............... H02K 5/02 |
| JP | 2010-158152 A | | 7/2010 | |
| JP | 2020005445 | * | 1/2020 | ............... H02K 5/16 |

OTHER PUBLICATIONS

Approaches to Suppressing Shaft Voltage in Non-Insulated Rotor Brushless DC Motor driven by PWM Inverter (Year: 2014).*

(Continued)

*Primary Examiner* — Terrance L Kenerly
(74) *Attorney, Agent, or Firm* — NKL Law; Yasuhide Ono

(57) ABSTRACT

A motor includes a stator that includes a stator core around which a stator winding is wound; magnets; a rotating body; a shaft; a rotor; a first bearing; a second bearing; a first metal bracket that fixes the first bearing; and a second metal bracket that fixes the second bearing. The stator core, the first metal bracket, and the second metal bracket are electrically connected, and when a connection point between the stator core and the first metal bracket or the second metal bracket is defined as a connection point A of a bearing outer ring, a capacitive member having a capacitance $C_n$ is located between a portion having the same potential as the connection point A and a portion having a zero reference potential of a drive circuit that applies a voltage to the stator core.

12 Claims, 14 Drawing Sheets

(56) References Cited

OTHER PUBLICATIONS

Maetani et al., "Approaches to Suppressing Shaft Voltage in Brushless DC Motor Driven by PWM Inverter Based on Ungrounded Common-Mode Equivalent Circuit", IEEJ Transactions on Industry Applications, (2012), vol. 132, No. 6, pp. 666-672. Cited in Specification. with Partial Translation. (9 pages).

* cited by examiner

MOTOR AND ELECTRIC APPARATUS INCLUDING THE SAME

CROSS REFERENCE TO RELATED APPLICATIONS

This application claims priority to Japanese Patent Application No. 2021-105913 filed on Jun. 25, 2021, the entire contents of which are incorporated by reference herein.

TECHNICAL FIELD

The present disclosure relates to a motor and an electric apparatus including the motor, and relates to a motor improved to suppress the occurrence of electrolytic corrosion of a bearing, and an electric apparatus including the motor.

BACKGROUND OF THE INVENTION

In recent years, there have been many cases where a motor adopts a system of driving by an inverter based on a pulse width modulation method (hereinafter, the method will be appropriately referred to as a PWM method) (for example, Patent Document 1).

A motor driven by an inverter based on a PWM inverter method is used in, for example, an electric apparatus such as an indoor unit of an air conditioner, an outdoor unit of an air conditioner, and a water heater.

PRIOR ART DOCUMENTS

Patent Documents

Patent Document 1: JP 2010-158152 A

Non-Patent Documents

Non-patent Document 1: Maetani, T., Isomura, Y., Watanabe, A., Iimori, K., & Morimoto, S. (2012). "Approaches to Suppressing Shaft Voltage in Brushless DC Motor Driven by PWM Inverter Based on Ungrounded Common-Mode Equivalent Circuit" IEEJ Transactions on Industry Applications in 2012, Vol. 132, No. 6, pp. 666-672.

SUMMARY OF THE INVENTION

The present disclosure aims to suppress the occurrence of electrolytic corrosion of a bearing in a motor and an electric apparatus including the motor.

A motor according to an aspect of the present disclosure includes
  a stator that includes a stator core around which a stator winding is wound;
  a rotor that includes a rotating body and a shaft, the rotating body holding magnets in a circumferential direction of the rotor and facing the stator, or holding magnets in a spoke shape from a center, the shaft penetrating a center of the rotating body;
  a first bearing and a second bearing that each support the rotating body;
  a first metal bracket and a second metal bracket that respectively fix the first bearing and the second bearing, the first metal bracket and the second metal bracket being electrically connected with the stator core; and
  a capacitive member that has a capacitance $C_n$, and is arranged between a first portion and a second portion, the first portion included in the motor and having the same potential as a connection point A, the second portion included in the motor and having a zero reference potential of a drive circuit that applies a voltage to the stator core, where the connection point A is defined as a connection point between the stator core and either the first metal bracket or the second metal bracket.

An electric apparatus according to another aspect of the present disclosure includes a motor; and
  a blower fan that is driven by the motor,
  wherein the motor includes:
  a stator that includes a stator core and a stator winding wound around the stator core;
  a rotor that includes a rotating body and a shaft, the rotating body holding magnets in a circumferential direction of the rotor and facing the stator, or holding magnets in a spoke shape from a center, the shaft penetrating a center of the rotating body;
  a first bearing and a second bearing that each support the rotating body;
  a first metal bracket and a second metal bracket that respectively fix the first bearing and the second bearing, the first metal bracket and the second metal bracket being electrically connected with the stator core; and
  a capacitive member that has a capacitance $C_n$, and is arranged between a first portion and a second portion, the first portion included in the motor and having the same potential as a connection point A, the second portion included in the motor and having a zero reference potential of a drive circuit that applies a voltage to the stator core, where the connection point A is defined as a connection point between the stator core and either the first metal bracket or the second metal bracket.

According to the aspect of the present disclosure, it is possible to suppress the occurrence of electrolytic corrosion of a bearing in a motor and an electric apparatus including the motor.

It should be noted that general or specific embodiments may be realized as a system, method, integrated circuit, computer program, storage media, or any elective combination thereof.

DETAILED DESCRIPTION OF THE INVENTION (Underlying Knowledge Forming Basis of the Present Disclosure)

Prior to describing an embodiment of the present disclosure, knowledge on which the present disclosure is based will be described.

When the motor is driven by an inverter based on a PWM inverter method, a neutral point potential of a stator winding fluctuates due to switching of a power element.

Patent Document 1 has proposed a countermeasure for preventing dielectric breakdown of an oil film of grease inside a bearing by reducing a shaft voltage to keep the oil film of the grease inside the bearing at a dielectric breakdown voltage or less, in order to suppress electrolytic corrosion of the bearing. In addition, a countermeasure for reducing damage of a metal surface inside the bearing by reducing the shaft voltage to reduce the discharge energy due to the dielectric breakdown of the oil film of the grease inside the bearing has been proposed in the following Patent Document 1.

Hereinafter, Patent Document 1 will be described in detail.

Figure 13:
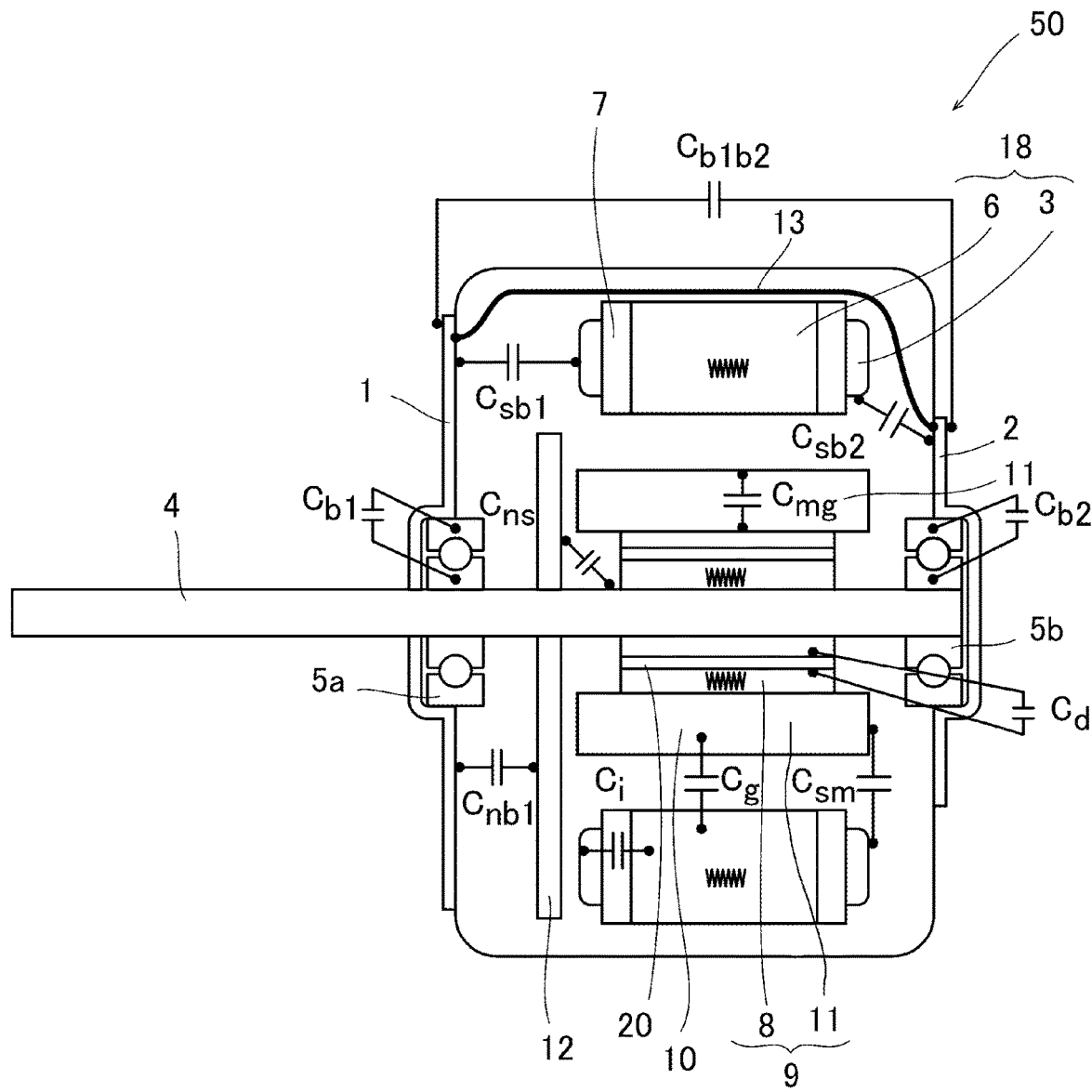
FIG. 13 is a schematic configuration diagram of a section of a motor in the related art.

FIG. 13 is a schematic configuration diagram of a section of an inner rotor type brushless radial motor 50 in Patent Document 1. Patent Document 1 and Non-patent Document 1 have the same configuration.

As illustrated in FIG. 13, the motor 50 includes first metal bracket 1 and second metal bracket 2 which are disposed at both ends of the motor 50, a pair of bearings (first bearing 5a and second bearing 5b), a shaft 4, a rotor 10, and a stator 18.

A rotating body 9 includes a rotor core 8, and magnets 11 which are permanent magnets. The rotor 10 includes the rotating body 9, and the shaft 4. The stator 18 includes a stator core 6, and a stator winding 3.

As illustrated in FIG. 13, the outer ring of the first bearing 5a is connected to the first metal bracket 1, and the outer ring of the second bearing 5b is connected to the second metal bracket 2. The inner ring of the first bearing 5a and the inner ring of the second bearing 5b are connected by the shaft 4 to be electrically conducted. The first metal bracket 1 and the second metal bracket 2 are electrically short-circuited by a conductive member 13.

In Patent Document 1, the first metal bracket 1 and the second metal bracket 2 are electrically short-circuited by the conductive member 13, and the capacitance of the first metal bracket 1 and the capacitance of the second metal bracket 2 are matched with each other. Further, Patent Document 1 discloses a method in which a dielectric layer 20 is provided on the rotating body 9, and the shaft voltage is reduced by changing the capacitance of the rotating body 9.

Patent Document 1 discloses that the shaft voltage can be set to 5V or less which is an indication of the dielectric breakdown voltage or less of the oil film inside a general bearing, by the dielectric layer 20.

The present inventors conducted detailed studies on Patent Document 1.

Figure 14:
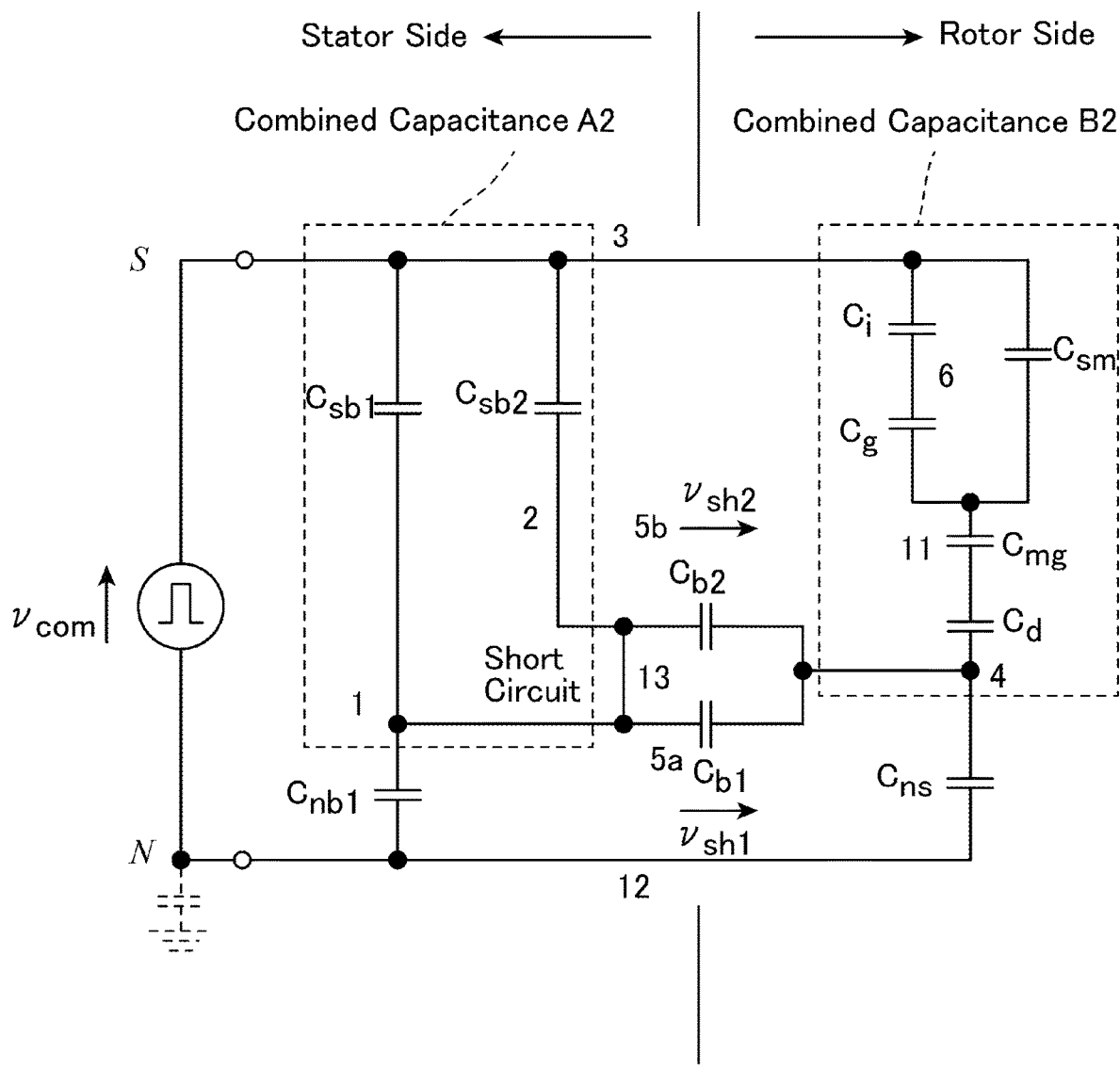
FIG. 14 is a model diagram of a capacitance distribution of the motor in FIG. 13.

FIG. 14 is a model diagram of a capacitance distribution of the motor 50 which Patent Document 1 discloses in FIG. 13. In the motor 50 of Patent Document 1, when the capacitance distribution is considered with reference to the stator core 6, a voltage distribution of the motor 50 is dominated by the influence of the capacitive reactance which is the reciprocal of the impedance, and thus the description will be made with reference to the model of the capacitance distribution as described in FIG. 5 of Non-patent Document 1.

A capacitance $C_{sb1}$ between the stator winding 3 and the first metal bracket 1 schematically represents that the charge of the first bearing 5a is stored and a first shaft voltage $V_{sh1}$ is increased. When the first shaft voltage $V_{sh1}$ is increased to reach the dielectric breakdown voltage of the grease oil film inside the bearing, the dielectric breakdown occurs. Similarly to the capacitance $C_{sb1}$, a capacitance $C_{sb2}$ between the stator winding 3 and the second metal bracket 2 also schematically represents that the charge of the second bearing 5b is stored and a second shaft voltage $V_{sh2}$ is increased. When the second shaft voltage $V_{sh2}$ is increased, the dielectric breakdown occurs.

The voltage generated between the outer ring side of the first bearing 5a and the outer ring side of the second bearing 5b, and a zero potential reference N(12) of a drive circuit is a value obtained by dividing a voltage $V_{com}$ generated between the zero reference potential N of the drive circuit and a neutral point potential S of the stator winding 3 by the capacitance distribution on the stator side.

The voltage generated between the inner ring side of the first bearing 5a and the inner ring side of the second bearing 5b (four locations in FIG. 14), and the zero potential reference N(12) of the drive circuit is a value obtained by dividing the voltage $V_{com}$ generated between the zero potential reference N(12) of the drive circuit and the neutral point potential S of the stator winding 3 by the capacitance distribution on the rotor side.

The present inventors devised a model diagram of the capacitance distribution of FIG. 14, and have found the following knowledge by considering the model diagram. The first shaft voltage $V_{sh1}$ and the second shaft voltage $V_{sh2}$ are a difference between the voltage generated on the outer ring side and the voltage generated on the inner ring side of the first bearing 5a and the second bearing 5b. Therefore, the present inventors has been found that it is effective to match or approximate the capacitance distribution on the stator side and the capacitance distribution on the rotor side in order to reduce the first shaft voltage $V_{sh1}$ and the second shaft voltage $V_{sh2}$.

The voltage generated between the outer ring side of the first bearing 5a and the zero potential reference N(12) of the drive circuit as well as the voltage generated between the outer ring side of the second bearing 5b and the zero potential reference N(12) of the drive circuit is obtained as the following. Hereby, the combined capacitance A2 is defined as a combined capacitance of the capacitance $C_{sb1}$ between the stator winding 3 and the first metal bracket 1 and the capacitance $C_{sb2}$ between the stator winding 3 and the second metal bracket 2. Then, the capacitance $C_{nb2}$ shows a capacitance between the zero reference potential N(12) of the drive circuit and the first metal bracket 1. The voltage is obtained by multiplying the reciprocal of a voltage division ratio $R_{A2}$ (combined capacitance A2/$C_{nb2}$) by the voltage Vcom.

In addition, the voltage generated between the inner ring side of the first bearing 5a and the zero potential reference N(12) of the drive circuit as well as the voltage generated between the inner ring side of the second bearing 5b and the zero potential reference N(12) of the drive circuit is obtained as following. Hereby a combined capacitance B2 is defined as a combined capacitance including a capacitance $C_i$ between the stator winding 3 and the stator core 6, a capacitance $C_g$ between the stator core 6 and the magnets 11, a capacitance $C_{sm}$ between the stator winding 3 and the magnets 11. Then, a capacitance $C_{ns}$ is a capacitance between the zero reference potential N of the drive circuit and the shaft 4. The voltage is obtained by multiplying the reciprocal of a voltage division ratio $R_{B2}$ (combined capacitance B2/$C_{ns}$) by the voltage Vcom.

That is, the present inventors has been found that it is necessary to match or approximate the capacitance distribution on the stator side and the capacitance distribution on the rotor side, that is, to match or approximate the voltage division ratio $R_{A2}$ (combined capacitance A2/$C_{nb2}$) and the voltage division ratio $R_{B2}$ (combined capacitance B2/$C_{ns}$) in order to reduce the first shaft voltage $V_{sh1}$ and the second shaft voltage $V_{sh2}$. Matching or approximating the voltage division ratio $R_{A2}$ and the voltage division ratio $R_{B2}$ is hereinafter simply referred to as matching.

In Patent Document 1, in FIG. 13, the dielectric layer 20 is located inside the rotating body 9 to form the electrostatic capacitance $C_d$. In FIG. 14 which is a model diagram of the capacitance distribution, the present inventors has been found that the capacitance $C_d$ of the dielectric layer 20 is inserted in series into the capacitance $C_m$ (combined capacitance B2) of the rotor 10, and the combined capacitance B2 is reduced to match the capacitance distribution on the stator side, and as a result, the first shaft voltage $V_{sh1}$ and the second shaft voltage $V_{sh2}$ are decreased.

The capacitance $C_d$ of the dielectric layer 20 is inversely proportional to the distance in a thickness direction of the dielectric layer 20 (the distance in a short direction of the dielectric layer 20 in FIG. 13), and is proportional to the length (the distance in the longitudinal direction of the dielectric layer 20 in FIG. 13). Therefore, in order to lower the capacitance $C_d$, it is necessary to increase the width of the dielectric layer 20 (the distance in the thickness direction of the dielectric layer 20).

However, as illustrated in FIG. 13, in Patent Document 1, there is a problem that providing the dielectric layer 20 on the rotating body 9 becomes complicated because the dielectric layer 20 is sandwiched by the mold of the rotating body 9. Then, Patent Document 1 has a problem that the strength of the rotating body 9 is reduced by the dielectric layer 20 being sandwiched. That is, since stress is applied to the dielectric layer 20 as rotational torque, there is a case where the width of the dielectric layer 20 is restricted in order to secure the strength. In that case, it is considered that the required capacitance cannot be obtained and the shaft voltage cannot be completely lowered. In addition, in Patent Document 1, in the motor 50 using the rotating body 9 that holds a plurality of permanent magnets (magnets) in a spoke shape from the center in a radial direction, there is a problem in that it is necessary to shorten the length of the permanent magnets (magnets) 11 by taking the width of the dielectric layer 20 and thus the performance of the motor 50 deteriorates.

The present inventors found the above-described problems, conducted intensive studies on the solution of the problems, and have found a device that solves the problems.

Figure 1:
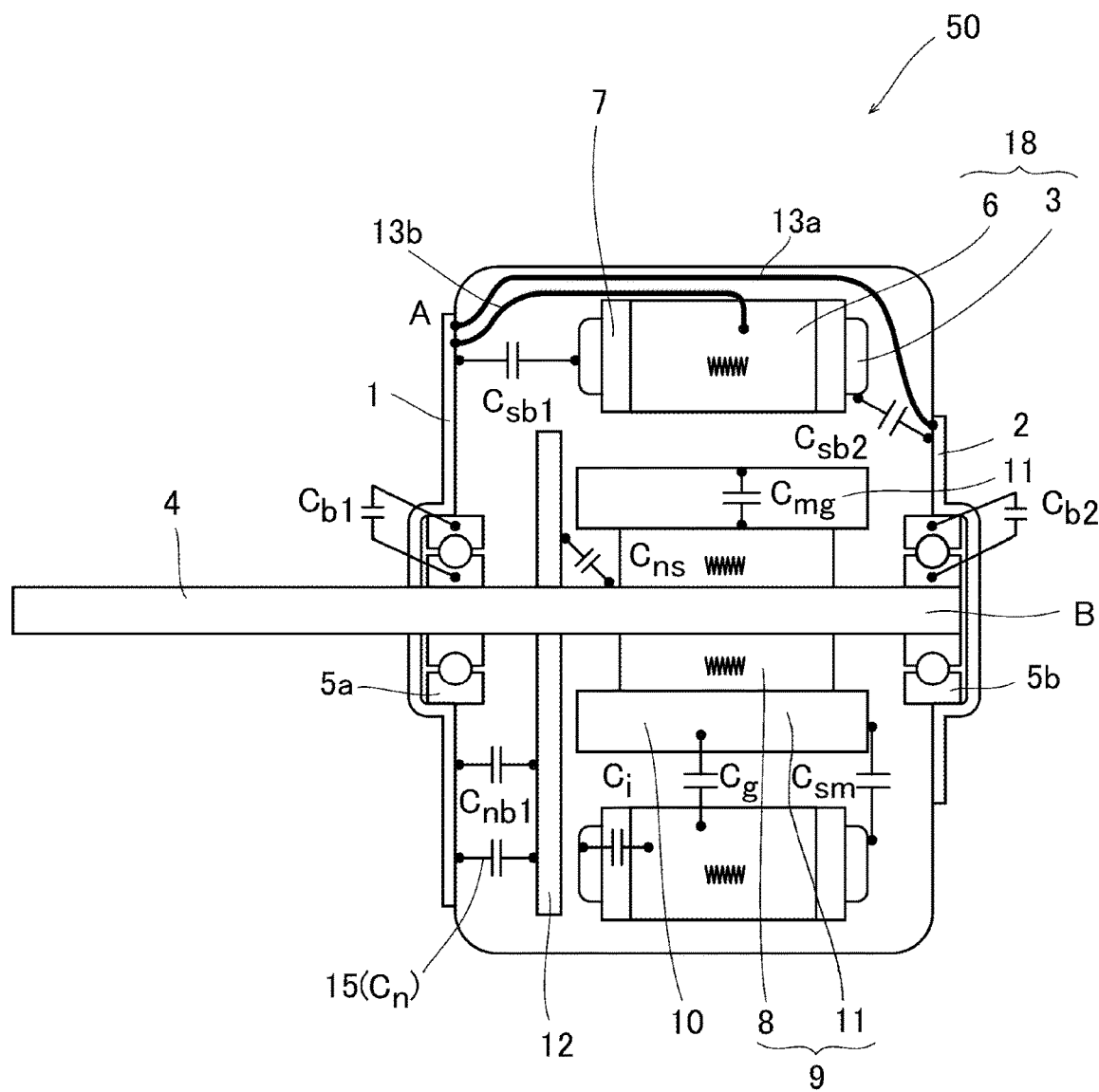
FIG. 1 is a schematic configuration diagram of a section of a motor according to a first embodiment as an aspect of the present disclosure.

FIG. 1 is a schematic configuration diagram of a section of the motor 50 which the present disclosure discloses.

As illustrated in FIG. 1, the motor 50 includes the first metal bracket 1 and the second metal bracket 2 which are disposed at both ends of the motor 50, the first bearing 5a, the second bearing 5b, the shaft 4, the rotor 10, and the stator 18.

The first bearing 5a fixed to the first metal bracket 1 is disposed at a central portion of the first metal bracket 1. The second bearing 5b fixed to the second metal bracket 2 is disposed at a central portion of the second metal bracket 2. The shaft 4 is supported and rotated by the first bearing 5a and the second bearing 5b.

The rotating body 9 includes the rotor core 8, and the magnets 11 which are permanent magnets. The rotor 10 includes the rotating body 9, and the shaft 4. The stator 18 includes the stator core 6, and the stator winding 3.

In the motor 50 of the present disclosure, the stator core 6, the first metal bracket 1, and the second metal bracket 2 are electrically connected.

In the case of FIG. 1, the first metal bracket 1 and the second metal bracket 2 are electrically connected using a first conductive member 13a. Further, the first metal bracket 1 and the stator core 6 are electrically connected using a second conductive member 13b.

A connection point between the stator core 6 and the first metal bracket 1 or the second metal bracket 2 is defined as a connection point A of the bearing outer ring.

In the case of FIG. 1, a connection point between the first metal bracket 1, the first conductive member 13a, and the second conductive member 13b is the connection point A of the bearing outer ring. Here, the connection point A of the bearing outer ring may be any place as long as the connection point is electrically connected to the first metal bracket 1, and the place is not limited.

The inner ring portion of the first bearing 5a and the inner ring portion of the second bearing 5b are defined as a connection point B of the bearing inner ring.

In the motor 50 of the present disclosure, a capacitive member 15 having the capacitance $C_n$ is located between a portion having the same potential as the connection point A of the bearing outer ring and a portion having the zero reference potential of the drive circuit that applies a voltage to the stator winding 3.

Figure 2:
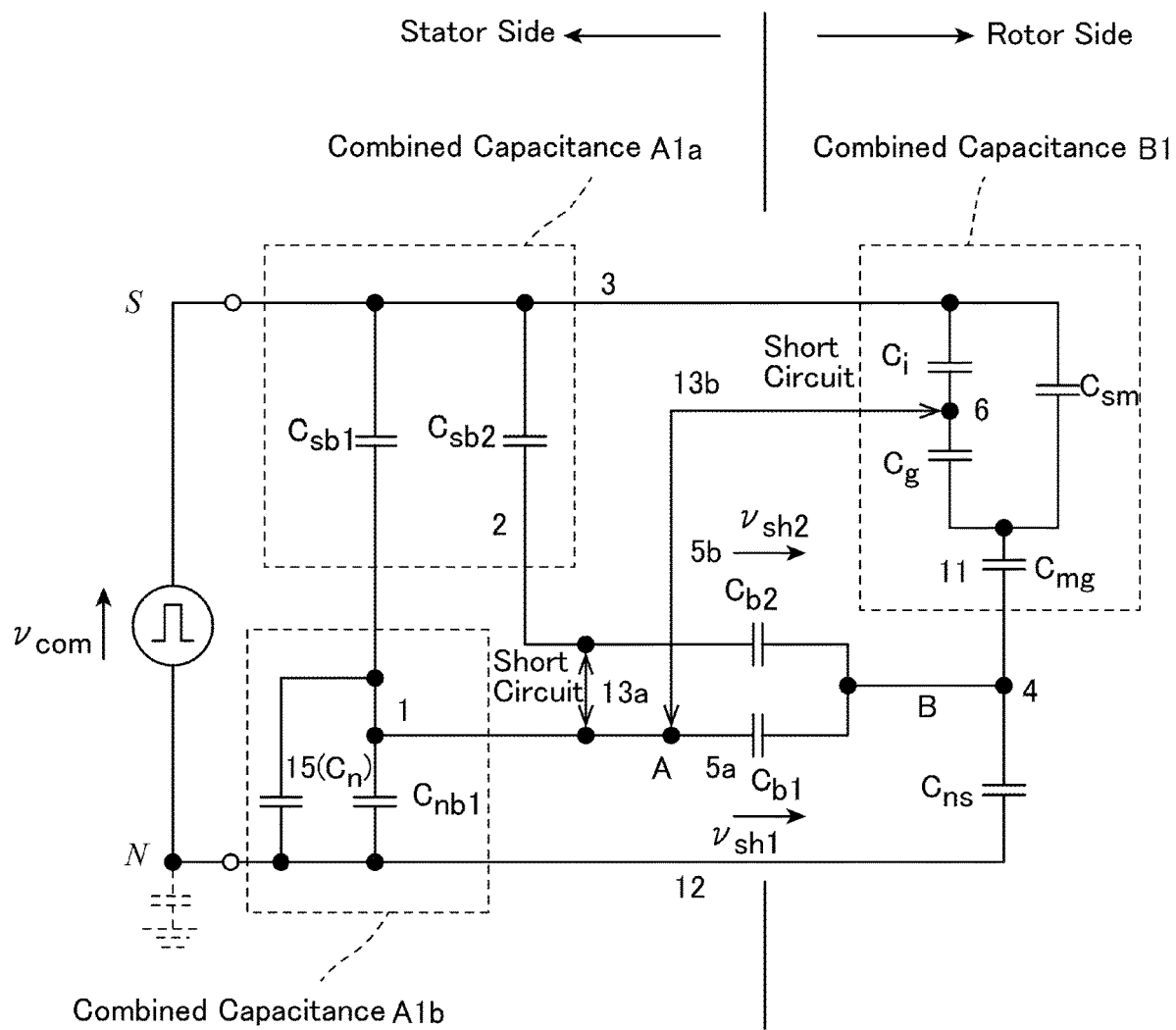
FIG. 2 is a model diagram of a capacitance distribution of the motor according to the first embodiment.

FIG. 2 is a model diagram of a capacitance distribution of the motor 50 which the present disclosure discloses.

On the stator 18 side on the left side, the capacitance between the stator winding 3 and the first metal bracket 1 is $C_{sb1}$. The capacitance between the stator winding 3 and the second metal bracket 2 is $C_{sb2}$. The capacitance between the first metal bracket 1 and the zero reference potential N(12) is $C_{nb1}$.

As illustrated in FIG. 2, the first metal bracket 1 and the stator core 6 are electrically short-circuited using the second conductive member 13b. The first metal bracket 1 and the second metal bracket 2 are electrically short-circuited using the first conductive member 13a. The capacitive member 15 having the capacitance $C_n$ is located between a portion having the same potential as the connection point A of the bearing outer ring and a portion having the zero reference potential N(12) of the drive circuit. The portion having the same potential as the connection point A of the bearing outer ring is a portion electrically conducted to the first metal bracket 1, the first conductive member 13a, the second conductive member 13b, and the second metal bracket 2.

The above mechanism will be described with reference to FIG. 2.

When the stator core 6, the first metal bracket 1, and the second metal bracket 2 are electrically connected by the first conductive member 13a and the second conductive member 13b, the potentials of the first metal bracket 1 and the second metal bracket 2 become close to the value of the neutral point potential S(3). That is, the potential of the connection point A of the bearing outer ring is increased.

Considering the connection point A of the bearing outer ring as a reference, a potential portion B of the bearing inner ring is a difference between the potential of the capacitance $C_g$ between the stator core 6 and the magnets 11, and the potential of the capacitance $C_{mg}$ of the magnets. This potential difference becomes the shaft voltage.

Since the potential of the connection point A of the bearing outer ring is higher than the potential of the potential portion B of the bearing inner ring, the capacitance distribution adjusted by the capacitance $C_n$ of the capacitive member 15 allows the potential of the connection point A of the bearing outer ring to be lower.

Although the potential of the potential portion B of the bearing inner ring is also decreased, the voltage drop is suppressed by the capacitance $C_i$ between the stator winding 3 and the stator core 6, and the capacitance $C_{sm}$ between the stator winding 3 and the rotor 10. As a result, by increasing the value of the capacitance $C_n$ of the capacitive member 15, the potential difference between the potential of the connection point A of the bearing outer ring and the potential portion B of the bearing inner ring is gradually decreased.

Furthermore, when the value of the capacitance $C_n$ of the capacitive member 15 is increased, the voltage drop of the potential portion B is suppressed, and the potential difference is reversed, and the polarity is reversed.

Therefore, by selecting an appropriate capacitance $C_n$ of the capacitive member 15 according to the value of the capacitance $C_m$ of the rotor 10, the shaft voltage can be reduced.

As described above, in the motor 50 of the present disclosure, the first metal bracket 1 and the second metal bracket 2 are electrically short-circuited using the first conductive member 13a, the first metal bracket 1 and the stator core 6 are electrically short-circuited using the second conductive member 13b, and the capacitive member 15 having the capacitance $C_n$ is located between the connection point A of the bearing outer ring and the zero reference potential N(12) of the drive circuit.

By connecting the first metal bracket 1 or the second metal bracket 2 to the stator core 6, the capacitance distribution on the stator 18 side and the capacitance distribution on the rotor 10 side are mixed from the separated form via the capacitance of the first bearing 5a and the second bearing 5b. As a result, the potential of the connection point A of the bearing outer ring and the potential of the connection point B of the bearing inner ring are approximated to each other, and in this state, the potential difference between the potential of the connection point A and the potential of the connection point B is further reduced by the capacitive member 15, and the shaft voltage can be reduced.

Based on the above consideration, the present inventors have come up with an aspect of the present disclosure described below.

A motor according to an aspect of the present disclosure includes
a stator that includes a stator core around which a stator winding is wound;
a rotor that includes a rotating body and a shaft, the rotating body holding magnets in a circumferential direction of the rotor and facing the stator, or holding magnets in a spoke shape from a center, the shaft penetrating a center of the rotating body;
a first bearing and a second bearing that each support the rotating body;
a first metal bracket and a second metal bracket that respectively fix the first bearing and the second bearing, the first metal bracket and the second metal bracket being electrically connected with the stator core; and
a capacitive member that has a capacitance $C_n$, and is arranged between a first portion and a second portion, the first portion included in the motor and having the same potential as a connection point A, the second portion included in the motor and having a zero reference potential of a drive circuit that applies a voltage to the stator core, where the connection point A is defined as a connection point between the stator core and either the first metal bracket or the second metal bracket.

According to the above aspect, the first metal bracket and the second metal bracket are electrically connected with the stator core and the capacitive member 15 mixes the capacitance distribution on the stator 18 side and the capacitance distribution on the rotor 10 side from the separated form via the capacitance of the first bearing 5a and the second bearing 5b. As a result, the potential of the connection point A of the bearing outer ring and the potential of the connection point B of the bearing inner ring are approximated to each other, and in this state, the capacitive member 15 reduces a potential difference between the potential of the connection point A and the potential of the connection point B, so that the shaft voltage can be reduced.

An electric apparatus according to another aspect of the present disclosure includes a motor; and
a blower fan that is driven by the motor,
wherein the motor includes:
a stator that includes a stator core and a stator winding wound around the stator core;
a rotor that includes a rotating body and a shaft, the rotating body holding magnets in a circumferential direction of the rotor and facing the stator, or holding magnets in a spoke shape from a center, the shaft penetrating a center of the rotating body;
a first bearing and a second bearing that each support the rotating body;
a first metal bracket and a second metal bracket that respectively fix the first bearing and the second bearing, the first metal bracket and the second metal bracket being electrically connected with the stator core; and
a capacitive member that has a capacitance $C_n$, and is arranged between a first portion and a second portion, the first portion included in the motor and having the same potential as a connection point A, the second portion included in the motor and having a zero reference potential of a drive circuit that applies a voltage to the stator core, where the connection point A is defined as a connection point between the stator core and either the first metal bracket or the second metal bracket.

According to the above aspect, in the motor of the electric apparatus, the first metal bracket and the second metal bracket are electrically connected with the stator core and the capacitive member 15 mixes the capacitance distribution on the stator 18 side and the capacitance distribution on the rotor 10 side from the separated form via the capacitance of the first bearing 5a and the second bearing 5b. As a result, the potential of the connection point A of the bearing outer ring and the potential of the connection point B of the bearing inner ring are approximated to each other, and in this state, the capacitive member 15 reduces a potential difference between the potential of the connection point A and the potential of the connection point B, so that the shaft voltage can be reduced.

Hereinafter, more specific embodiments of the present disclosure will be described. However, unnecessarily detailed description may be omitted. For example, a detailed description of a well-known matter and a repeated description of substantially the same configuration may be omitted. This is to avoid unnecessary redundancy of the following description and to facilitate understanding of those skilled in the art. Note that the present inventors provide the accompanying drawings and the following description in order for those skilled in the art to fully understand the present disclosure, and do not intend to limit the subject matter described in the claims by the accompanying drawings and the following description. In the following description, the same or similar components are denoted by the same reference numerals.

First Embodiment

Hereinafter, a motor according to an aspect of the present disclosure will be described with reference to the drawings.

FIG. 1 is a schematic configuration diagram of a section of the inner rotor type brushless radial motor 50 illustrating an aspect of the present disclosure.

As illustrated in FIG. 1, the first metal bracket 1 having conductivity and the second metal bracket 2 having conductivity are disposed at both ends of the motor 50.

As a result, the bearing is stably supported, and the shaft 4 can be rotated.

The first bearing 5a fixed to the first metal bracket 1 and a second bearing 5b fixed to the second metal bracket 2 are disposed at central portions of the first metal bracket 1 and the second metal bracket 2. The shaft 4 is supported and rotated by the first bearing 5a and the second bearing 5b. The shaft 4 protrudes from the first metal bracket 1.

The stator 18 generates a rotating magnetic field to rotate the rotor 10 by the rotating magnetic field. The rotor 10 is inserted into the inner side of the stator 18 with a gap between the rotor 10 and the stator 18.

The stator 18 includes the stator core 6 and the stator winding 3 which is a winding. The stator winding 3 is wound around the stator core 6 with a resin 7 for insulating the stator core 6 interposed therebetween. The stator 18 is molded using resin together with other fixing members such as the first metal bracket 1 and the second metal bracket 2. In the first embodiment, these members are molded integrally in this manner to form a stator of which the outer shape is a substantially cylindrical shape. The integrally molded product also functions as a housing of the motor 5. The first metal bracket 1 and the second metal bracket 2 may be insulated from the stator core 6 by a space.

The rotor 10 is rotated in the motor 50, and includes the shaft 4 and the rotating body 9. The rotating body 9 includes the rotor core 8, and the magnets 11 that are permanent magnets as ferrite magnets. The rotor 10 holds a plurality of magnets 11 on the outer periphery of the rotor core 8, and includes the shaft 4 such that the shaft 4 penetrates the center of the rotor core 8. Furthermore, the rotor 10 may hold the plurality of magnets 11 arranged in a spoke shape from the center facing the stator 18.

The first bearing 5a and the second bearing 5b that support the shaft 4 are attached to the shaft 4. The first bearing 5a and the second bearing 5b are cylindrical-shaped bearings having a plurality of iron balls, and inner ring sides of the first bearing 5a and the second bearing 5b are fixed to the shaft 4.

The outer ring sides of the first bearing 5a and the second bearing 5b are fixed by the first metal bracket 1 having conductivity and the second metal bracket 2 having conductivity, respectively. In FIG. 1, the first bearing 5a is fixed to the first metal bracket 1, the second bearing 5b is fixed to the second metal bracket 2, the shaft 4 is supported by the first bearing 5a and the second bearing 5b, and the rotor 10 is rotated rotatably. The shaft 4, the inner ring of the first bearing 5a, and the inner ring of the second bearing 5b are electrically conducted to each other.

Further, a printed circuit board 12 on which a drive circuit (not illustrated) for generating a rotating magnetic field is mounted is disposed between the rotor 10 and the first metal bracket 1 inside the motor 50. For example, an inverter circuit or the like is mounted on the drive circuit in order to apply a voltage to the stator winding 3.

In the motor 50 configured as described above, when a voltage is applied to the stator winding 3 from the drive circuit, a current flows through the stator winding 3, and a magnetic field is generated from the stator core 6. Then, due to the rotating magnetic field from the stator core 6 and the magnetic field from the magnets 11, attractive force and repulsive force are generated according to the polarity of these magnetic fields, and the rotor 10 is rotated around the shaft 4 by these forces.

As illustrated in FIG. 1, one end portion of the first conductive member 13a as a short-circuit line is connected to the first metal bracket 1, and the other end portion of the first conductive member 13a is connected to the second metal bracket 2. One end portion of the second conductive member 13b as a short-circuit line is connected to the first metal bracket 1, and the other end portion of the second conductive member 13b is connected to the stator core 6. As a result, the first metal bracket 1, the second metal bracket 2, and the stator core 6 have the same potential.

Here, a connection point between the stator core 6 and the first metal bracket 1 or the second metal bracket 2 is defined as the connection point A of the bearing outer ring.

In the case of FIG. 1, a connection point between the first metal bracket 1, the first conductive member 13a, and the second conductive member 13b is the connection point A of the bearing outer ring.

The capacitive member 15 having the capacitance $C_n$ is connected between a portion having the same potential as the connection point A of the bearing outer ring and the ground as the reference potential N(12) of the drive circuit. The portion having the same potential as the connection point A of the bearing outer ring is a portion electrically conducted to the first metal bracket 1, the first conductive member 13a, the second conductive member 13b, and the second metal bracket 2. The ground and the earth are insulated.

The capacitive member 15 is, for example, a ceramic capacitor. The capacitive member 15 is, for example, a molded product in which electrodes are provided on both sides of a resin such as PBT. The form of the capacitive member 15 is not particularly limited as long as the capacitive member can store charges. The capacitive member 15 may be disposed anywhere inside the motor 50, and is disposed, for example, on the printed circuit board 12 on which the drive circuit is mounted.

FIG. 2 is a model diagram of the capacitance distribution of the first embodiment.

In FIG. 2, with the first bearing 5a and the second bearing 5b located at the center as boundaries, the left side represents the capacitance distribution on the stator 18 side, and the right side represents the capacitance distribution on the rotor 10 side.

The voltage $W_{com}$ applied to the stator winding 3 by the drive circuit is a potential difference between the neutral point potential S(3) and the zero reference potential N(12).

The first metal bracket 1, the second metal bracket 2, and the stator core 6 are short-circuited by the first conductive member 13a and the second conductive member 13b, and the short-circuited portion becomes the connection point A of the bearing outer ring. The capacitive member 15 having the capacitance $C_n$ is connected between the connection point A of the bearing outer ring and the ground as the reference potential N(12) of the drive circuit.

On the stator 18 side on the left side, a combined capacitance A1a is a combined capacitance of the capacitance $C_{sb1}$ and the capacitance $C_{sb2}$, and a combined capacitance $A1_b$ is a combined capacitance of the capacitance $C_{nb1}$ and the capacitance $C_n$.

On the rotor 10 side on the right side, a combined capacitance B1 is a combined capacitance of the capacitance $C_i$ between the stator winding 3 and the stator core 6, the capacitance $C_g$ between the stator core 6 and the magnets 11, the capacitance $C_{sm}$ between the stator winding 3 and the magnets 11, and the capacitance $C_{mg}$ of the magnets 11.

The capacitance between the shaft 4 and the zero reference potential N(12) of the drive circuit is $C_{ns}$.

Figure 3:
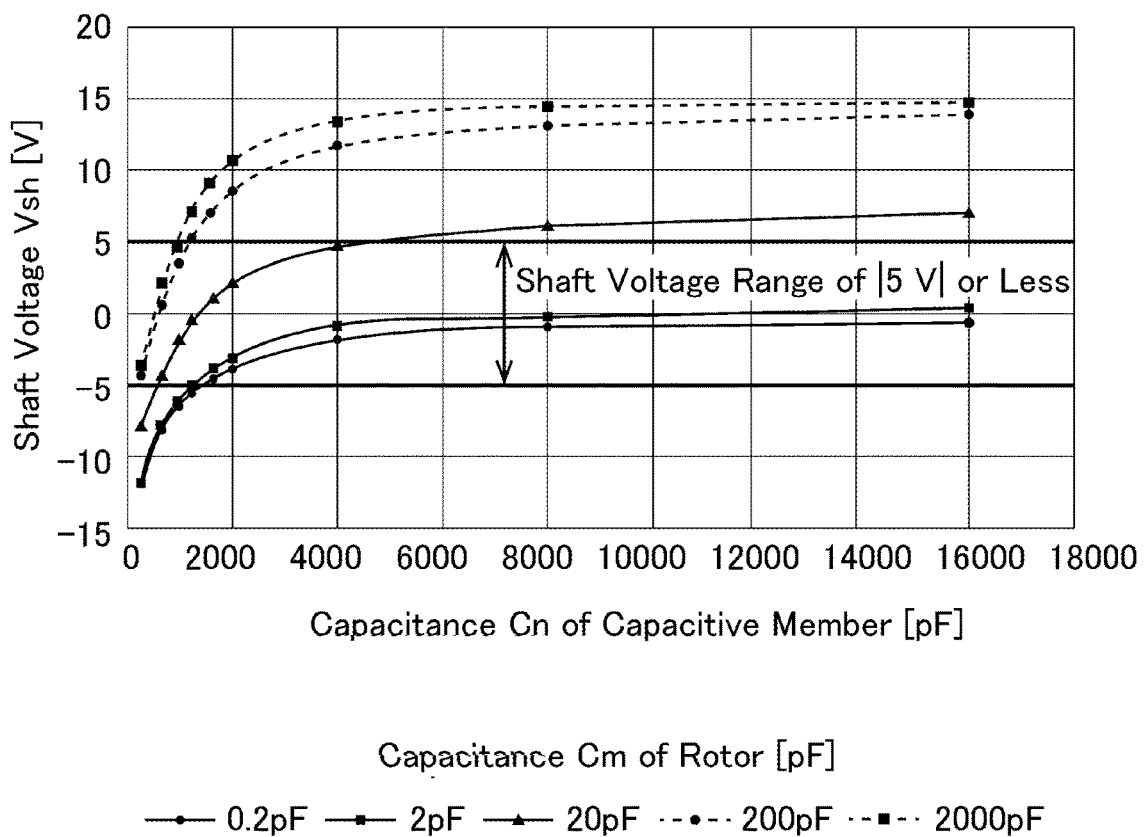
FIG. 3 is a graph illustrating a relationship between an electrostatic capacitance between a bracket and a ground, and a shaft voltage of the motor according to the first embodiment.

FIG. 3 is a simulation result obtained by calculating a shaft voltage $V_{sh1}$ of the first bearing 5a and a shaft voltage $V_{sh2}$ of the second bearing 5b by changing the value of the capacitance $C_n$ of the capacitive member 15. Since both the first bearing 5a and the second bearing 5b are short-circuited to have the same potential, the shaft voltage is simply expressed as $V_{sh}$.

In FIG. 3, the horizontal axis represents the value of the capacitance $C_n$ of the capacitive member 15, and the vertical axis on the left side represents the shaft voltage $V_{sh}$. For the shaft voltage $V_{sh}$, a voltage of the inner ring was measured with reference to the outer rings of the first bearing 5a and the second bearing 5b, a case where the voltage of the inner ring was higher than that of the outer ring was defined as plus, and a case where the voltage of the inner ring was lower than that of the outer ring was defined as minus.

Non-patent Document 1 illustrates that the value of the capacitance $C_n$ of the rotor 10 in which satisfies the absolute value of the shaft voltage Vsh of 5 V or less is, for example, approximately within 2 pF to 20 pF.

In consideration of a range in which the capacitance $C_m$ of the rotor 10 can be sufficiently taken, as the motor 50, a simulation was performed in the cases of 0.2 pF that is $\frac{1}{10}$ of the minimum value 2 pF, 200 pF that is 10 times of the maximum value 20 pF, and 2000 pF that is 100 times of the maximum value 20 pF, in addition to the cases of 2 pF and 20 pF.

The graph in a case where the capacitance $C_m$ of the rotor 10 is 0.2 pF is a solid line-black circle graph (hereinafter, referred to as a graph 1). As the capacitance $C_n$ of the capacitive member is increased, the above graph is increased from the lower left to the upper right, and the shaft voltage $V_{sh}$ is saturated at a constant voltage (for example, about −0.5 V). When the capacitance $C_n$ is 1500 pF, the shaft voltage $V_{sh}$ is about −4V, and the shaft voltage $V_{sh}$ falls within a range of the absolute value |5 V|. Further, even when the capacitance $C_n$ is increased, the shaft voltage $V_{sh}$ falls within the range of the absolute value |5 V|.

The graph in a case where the capacitance $C_m$ of the rotor 10 is 2 pF is a solid line-square mark graph (hereinafter, referred to as a graph 2). The behavior of the graph 2 is substantially similar to that of the graph 1, and is obtained by shifting the graph 1 slightly upward.

The graph in a case where the capacitance $C_m$ of the rotor 10 is 20 pF is a solid line-triangle mark graph (hereinafter, referred to as a graph 3). In the graph 3, when capacitance $C_n$ is 500 pF, the shaft voltage $V_{sh}$ is about −4 V, and when capacitance $C_n$ is 5000 pF, the shaft voltage $V_{sh}$ exceeds 5 V. When the capacitance $C_n$ exceeds 5000 pF, the shaft voltage $V_{sh}$ exceeds 5V, and the shaft voltage $V_{sh}$ exceeds the range of the absolute value |5 V|. In the graph 3, the range of the capacitance $C_n$ in which the shaft voltage $V_{sh}$ falls within the range of the absolute value |5 V| is, for example, 500 pF to 5000 pF, and there is the capacitance $C_n$ in which the shaft voltage $V_{sh}$ falls within the range of the absolute value |5 V|.

The graph in a case where the capacitance $C_m$ of the rotor 10 is 200 pF is a dotted line-black circle graph (hereinafter, referred to as a graph 4). In the graph 4, when the capacitance $C_n$ is 250 pF, the shaft voltage $V_{sh}$ already falls within the range of the absolute value |5 V|. In the graph 4, when the capacitance $C_n$ is 1000 pF, the shaft voltage $V_{sh}$ exceeds 5 V. In the graph 4, there is also a capacitance $C_n$ in which the shaft voltage $V_{sh}$ falls within the range of the absolute value |5 V|.

The graph in a case where the capacitance $C_m$ of the rotor 10 is 2000 pF is a dotted line-square mark graph (hereinafter, referred to as a graph 5). In the graph 5, when the capacitance $C_n$ is 250 pF, the shaft voltage $V_{sh}$ already falls within the range of the absolute value |5 V|. In the graph 5, when the capacitance $C_n$ is 800 pF, the shaft voltage $V_{sh}$ exceeds 5 V. In the graph 5, there is also a capacitance $C_n$ in which the shaft voltage $V_{sh}$ falls within the range of the absolute value |5 V|.

As is clear from FIG. 3, it can be seen that there is the capacitance $C_n$ in which the absolute value of the shaft voltage $V_{sh}$ can be set to 5 V or less, in the range from the small value to the large value of the capacitance $C_m$ of the rotor 10.

Specifically, when the capacitance $C_m$ of the rotor 10 is in the range of 0.2 pF or more and 2000 pF or less, there is the capacitance $C_n$ in which the absolute value of the shaft voltage $V_{sh}$ falls within the range of 5V or less when the capacitance $C_n$ is, for example, 250 pF or more and 5000 pF or less.

Therefore, unlike Patent Document 1, in the motor 50 of the present disclosure, it is not necessary to interpose the dielectric layer 20 into the rotor 10 to adjust the capacitance distribution on the rotor 10 side. That is, even in the rotor 10 having a general structure in which the dielectric layer 20 is not disposed in the rotor 10, it is possible to suppress the occurrence of electrolytic corrosion of the bearing by reducing the shaft voltage.

The above mechanism will be described in detail with reference to FIG. 2.

When the stator core 6, the first metal bracket 1, and the second metal bracket 2 are electrically connected by the first conductive member 13a and the second conductive member 13b, the potentials of the first metal bracket 1 and the second metal bracket 2 become close to the value of the neutral point potential S(3). That is, the potential of the connection point A of the bearing outer ring is increased.

The potential portion B of the bearing inner ring is determined by a voltage division ratio based on the distribution of the capacitance on the rotor 10 side. The potential portion B of the bearing inner ring becomes a value lower than the connection point A of the bearing outer ring by the capacitance $C_g$ between the stator core 6 and the magnets 11 and the capacitance $C_{mg}$ of the magnets 11. The potential difference between the potential of the connection point A of the bearing outer ring and the potential portion B of the bearing inner ring varies depending on the value of the capacitance $C_m$ of the rotor 10 (refer to FIG. 3).

Since the potential of the connection point A of the bearing outer ring is higher than the potential of the potential portion B of the bearing inner ring, the capacitance distribution on the stator side is adjusted by the capacitance $C_n$ of the capacitive member 15, and the potential of the connection point A of the bearing outer ring is lowered. As a result, the potential difference between the potential of the connection point A of the bearing outer ring and the potential of the potential portion B of the bearing inner ring can be decreased.

As the value of the capacitance $C_m$ of the rotor 10 is increased, the potential of the connection point A of the bearing outer ring approaches the potential of the potential portion B of the bearing inner ring, and then the polarity is reversed.

Furthermore, as the capacitance $C_n$ of the capacitive member 15 is increased, the potential difference is increased this time.

Therefore, by selecting an appropriate capacitance $C_n$ of the capacitive member 15 according to the value of the capacitance $C_m$ of the rotor 10, the shaft voltage can be reduced.

As described above, in the motor 50 of the present disclosure, the first metal bracket 1 and the second metal bracket 2 are electrically short-circuited using the first conductive member 13a, the first metal bracket 1 and the stator core 6 are electrically short-circuited using the second conductive member 13b, and the capacitive member 15 having the capacitance $C_n$ is located between the connection point A of the bearing outer ring and the zero reference potential N(12) of the drive circuit.

In this state, the value of the capacitance $C_n$ of the capacitive member 15 is adjusted such that the potential difference between the connection point A of the bearing outer ring and the connection point B of the bearing inner ring is reduced by the capacitive member 15, and thereby the shaft voltage $V_{sh}$ is reduced.

In FIG. 1, the first metal bracket 1 and the second metal bracket 2 are connected to be electrically short-circuited using the first conductive member 13a. Further, the first metal bracket 1 and the stator core 6 are connected to be electrically short-circuited using the second conductive member 13b.

In the above configuration, the first metal bracket 1, the second metal bracket 2, and the stator core 6 are connected to have the same potential.

In addition to the form of FIG. 1, the configuration having the same potential includes the following forms of a first modification and a second modification.

The first modification will be described.

First Modification

Figure 4:
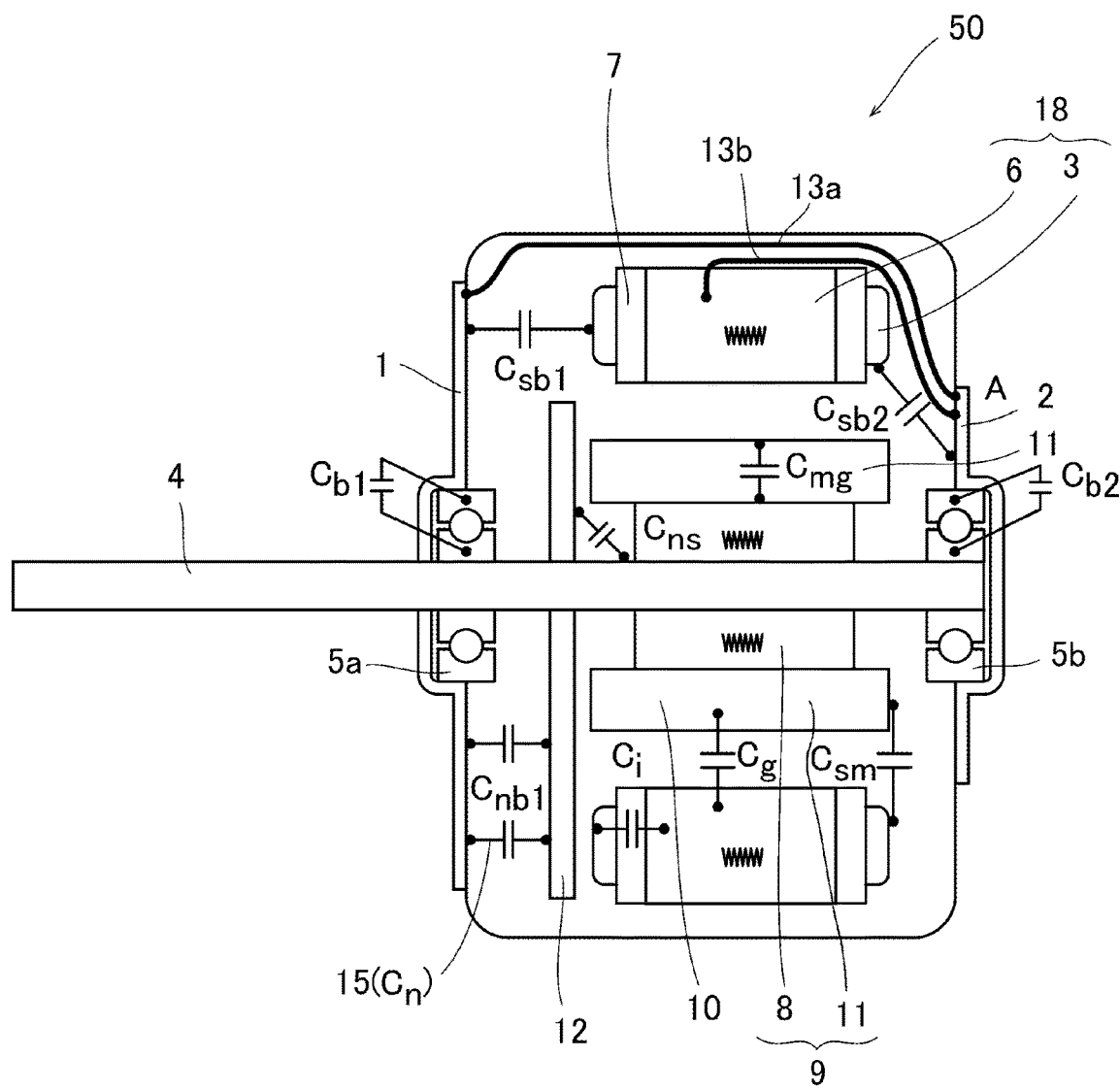
FIG. 4 illustrates a modification of the motor according to the first embodiment.

FIG. 4 is a diagram illustrating a modification of the motor 50 of FIG. 1.

The difference from FIG. 1 is that the second conductive member 13b is disposed between the stator core 6 and the second metal bracket 2 to electrically conduct the stator core 6 and the second metal bracket 2.

In the case of FIG. 4, the connection point A of the bearing outer ring is a connection point A (A on the right side in FIG. 4) between the second conductive member 13b and the second metal bracket 2.

Figure 5:
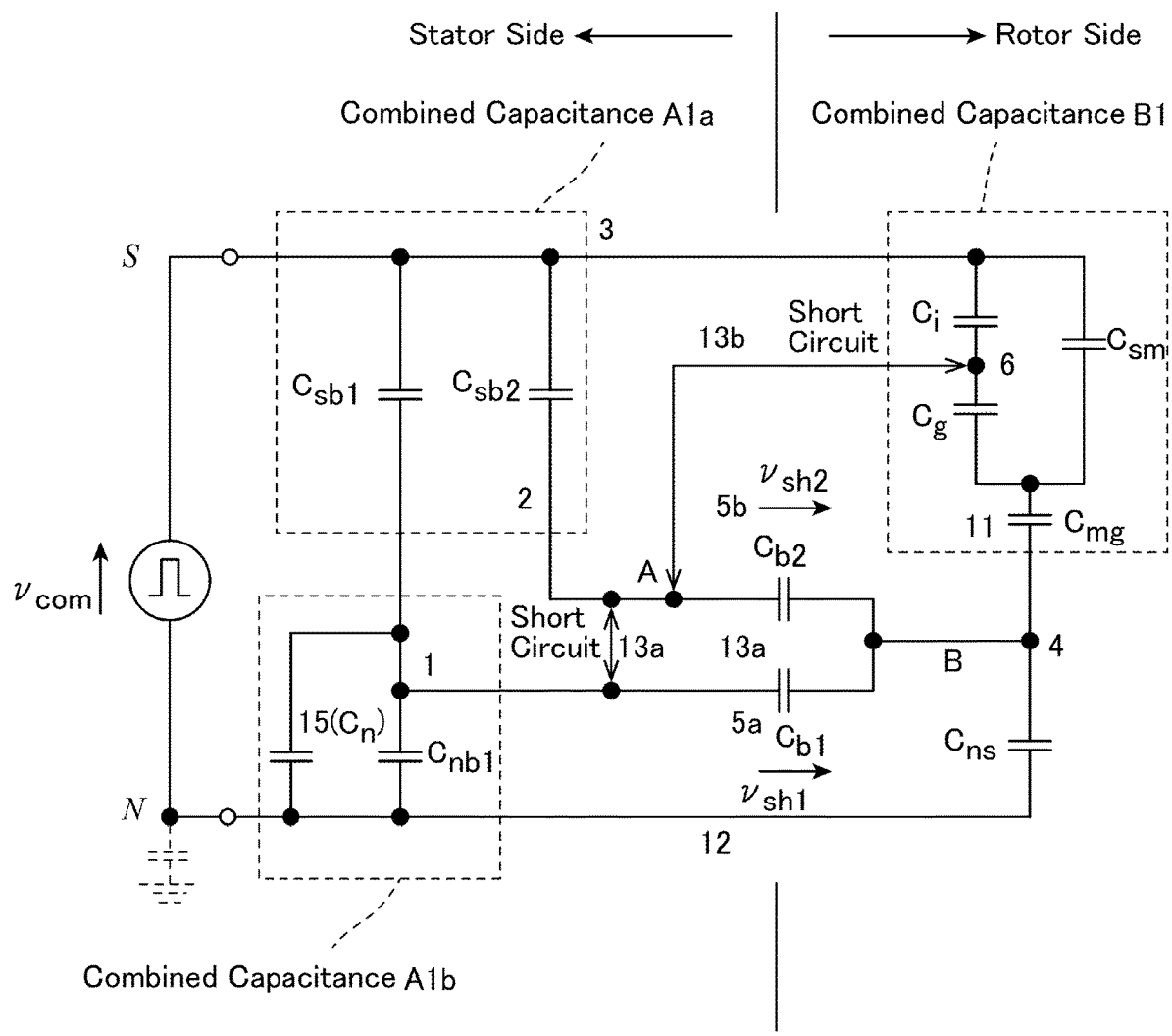
FIG. 5 is a model diagram of a capacitance distribution of the motor in FIG. 4.

FIG. 5 is a model diagram of a capacitance distribution of the motor 50 of FIG. 4.

The difference from FIG. 2 is that the second conductive member 13b electrically conducts and short-circuits the stator core 6 and the second metal bracket 2. A short-circuit point between the stator core 6 and the second metal bracket 2 is the connection point A of the bearing outer ring.

In the first modification, the same operations and effects as those in FIGS. 1 and 2 can be obtained.

Second Modification

The second modification will be described.

Figure 6:
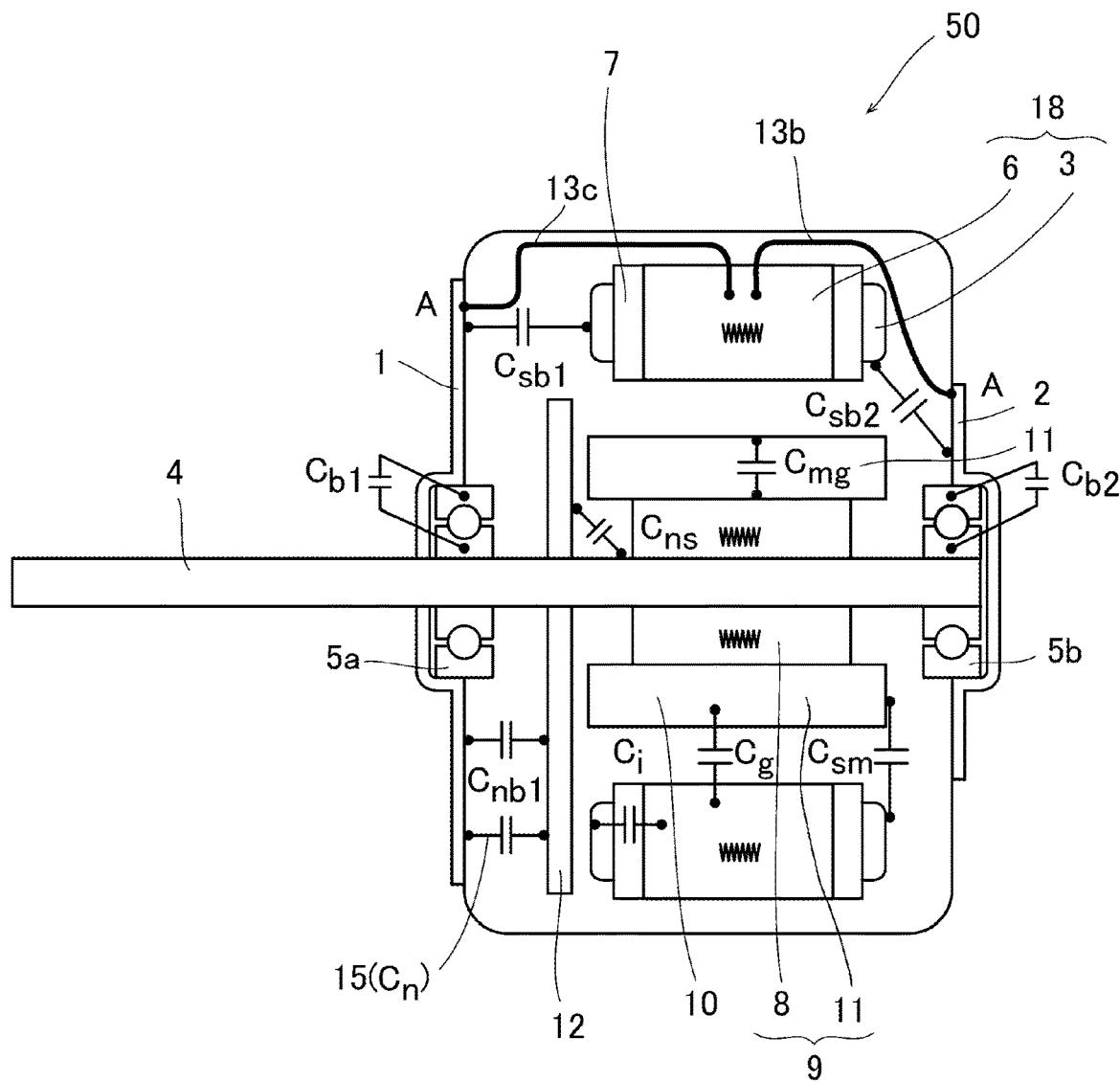
FIG. 6 is a diagram illustrating another modification of the motor according to the first embodiment.

FIG. 6 is a diagram illustrating another modification of the motor 50 of FIG. 1.

The difference from FIGS. 1 and 4 is that the first conductive member 13a is eliminated and a third conductive member 13c is disposed instead.

The second conductive member 13b is disposed between the stator core 6 and the second metal bracket 2 to electrically conduct the stator core 6 and the second metal bracket 2.

The third conductive member 13c is disposed between the stator core 6 and the first metal bracket 1 to electrically conduct the stator core 6 and the first metal bracket 1.

In the case of FIG. 6, there are two connection points A of the bearing outer ring. (1) The first connection point is the connection point A (A on the right side in FIG. 6) between the second conductive member 13b and the second metal bracket 2, and (2) the second connection point is the connection point A (A on the left side in FIG. 6) between the third conductive member 13c and the first metal bracket 1.

In the case of FIG. 6, the portion having the same potential as the connection point A of the bearing outer ring is a portion electrically conducting the first metal bracket 1, the second conductive member 13b, the third conductive member 13c, and the second metal bracket 2.

Figure 7:
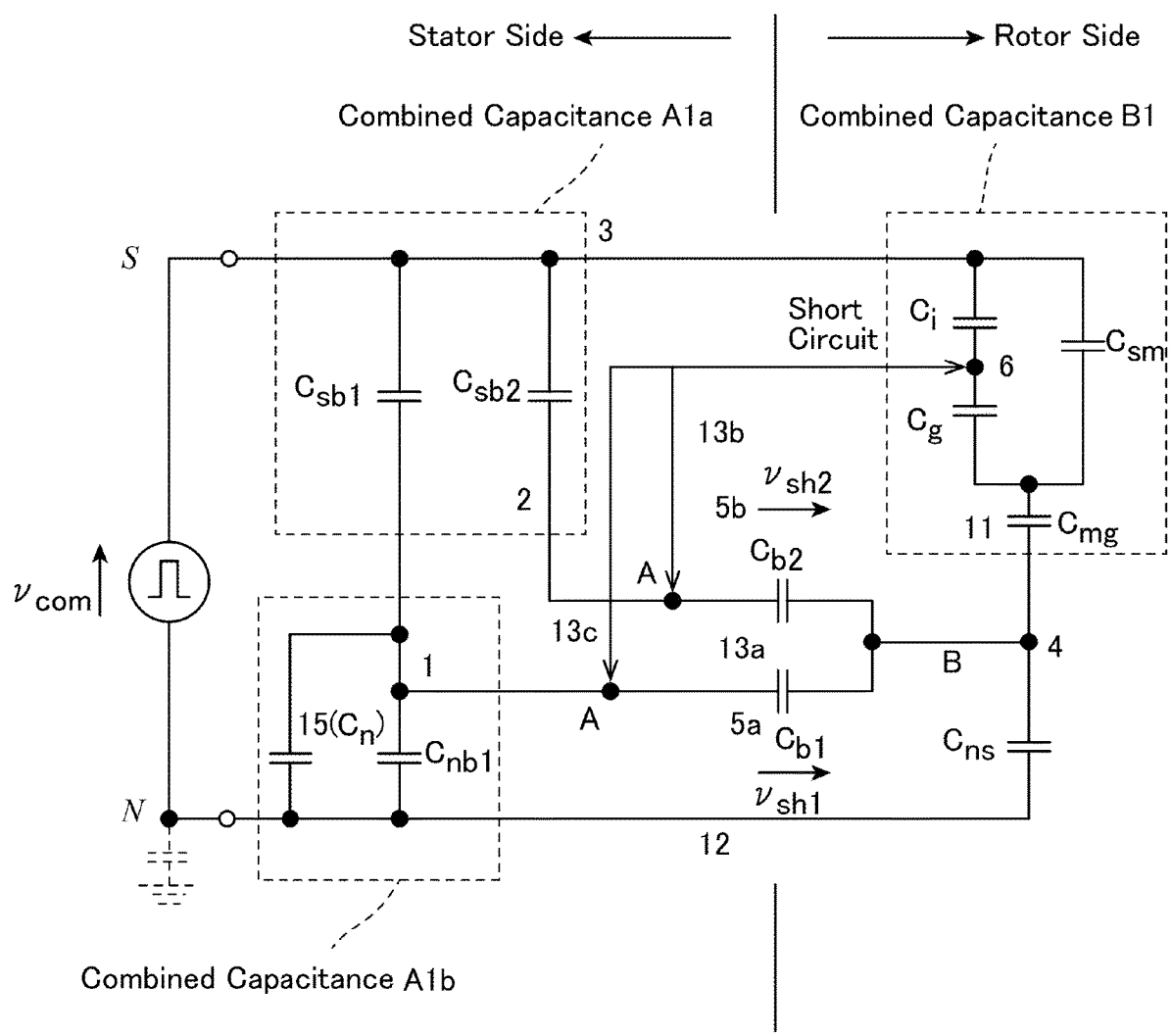
FIG. 7 is a model diagram of a capacitance distribution of the motor in FIG. 6.

FIG. 7 is a model diagram of a capacitance distribution of the motor 50 of FIG. 6.

The difference from FIGS. 2 and 5 is that the second conductive member 13b electrically conducts and short-circuits the stator core 6 and the second metal bracket 2, and the third conductive member 13c electrically conducts and short-circuits the stator core 6 and the first metal bracket 1. These short-circuit points become the connection points A of the bearing outer ring.

In the second modification, the same operations and effects as those in FIGS. 1 and 2 can be obtained.

Third Modification

Figure 8:
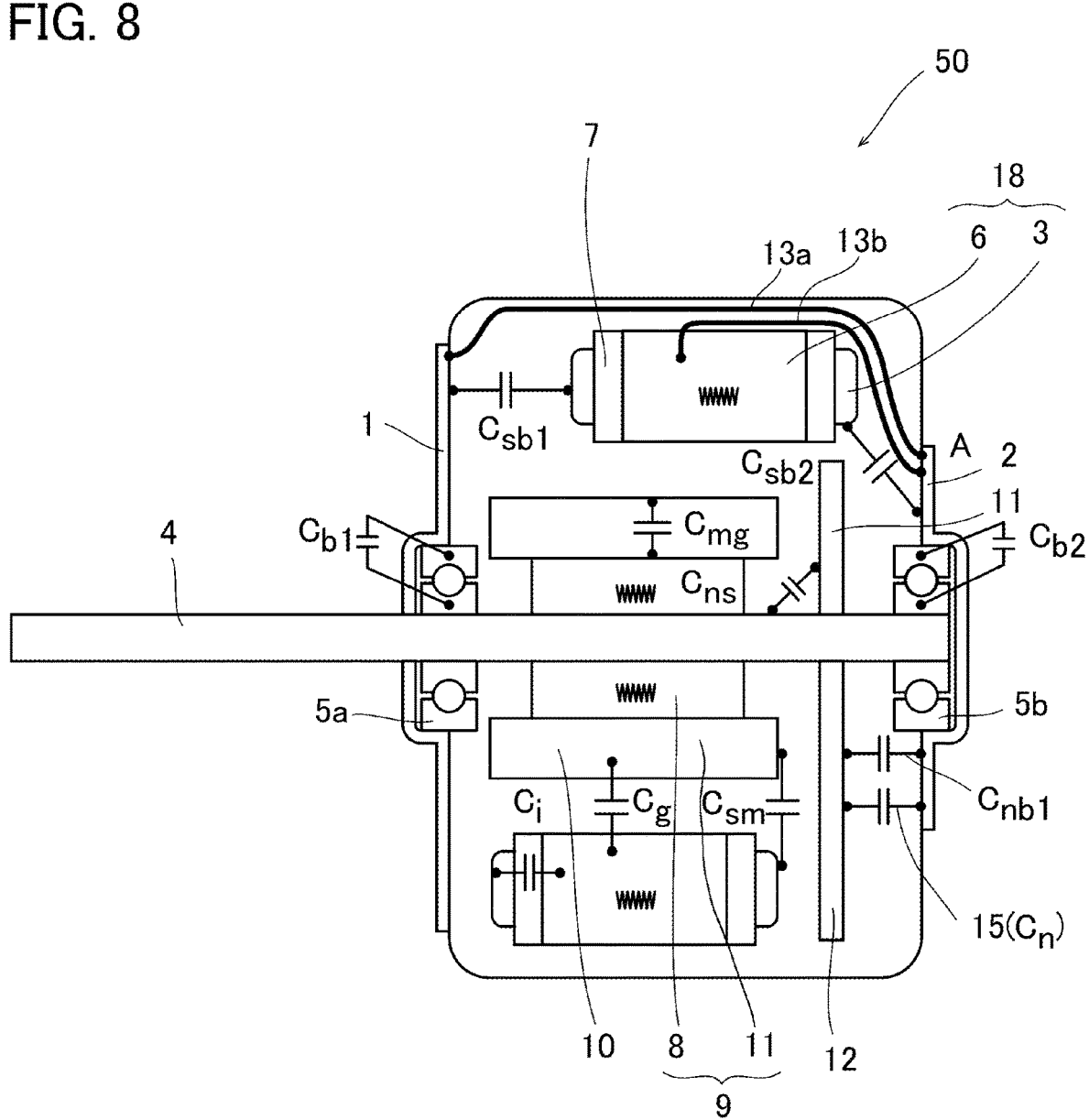
FIG. 8 is a schematic configuration diagram of a section of a motor according to the first embodiment as another aspect of the present disclosure.

FIG. 8 is a diagram illustrating another modification of the motor 50 of FIG. 1.

The difference from FIG. 1 is that the printed circuit board 12 on which a drive circuit (not illustrated) is mounted is disposed between the second metal bracket 2 and the rotating body 9.

In FIG. 8, the second conductive member 13b is disposed between the second metal bracket 2 and the stator core 6 to electrically conduct the stator core 6 and the second metal bracket 2.

In the third modification, the same operations and effects as those in FIGS. 1 and 2 can be obtained.

In the third modification, as illustrated in FIG. 1, the second conductive member 13b may be disposed between the first metal bracket 1 and the stator core 6 to electrically conduct the stator core 6 and the first metal bracket 1.

Second Embodiment

As an example of an electric apparatus according to the present disclosure, a configuration of an air conditioner indoor unit will be described in detail as a second embodiment. The electric apparatus according to the present disclosure is not necessarily limited to these examples.

Figure 10:
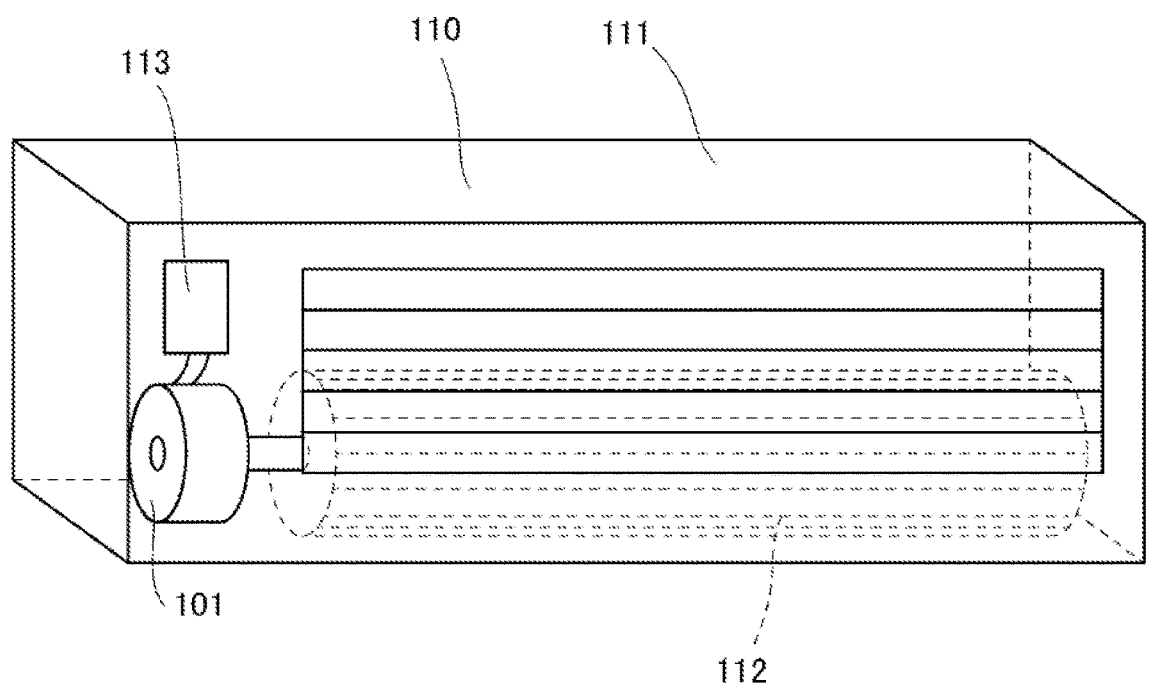
FIG. 10 is a perspective view of an aspect of an electric apparatus using the motor according to the first embodiment.

In FIG. 10, a brushless motor 101 is provided in a housing 111 of an air conditioner indoor unit 110. A cross flow fan 112, which is a blower fan, is attached to a rotation shaft of the brushless motor 101. The brushless motor 101 is driven by a motor drive device 113. The brushless motor 101 is rotated by the energization from the motor drive device 113, and the cross flow fan 112 is rotated accordingly. The rotation of the cross flow fan 112 causes an indoor unit heat exchanger (not illustrated) to blow air-conditioned air into the room. Here, for example, the motor 50 of the first embodiment described above can be applied to the brushless motor 101.

The electric apparatus of the present disclosure includes the brushless motor and the housing in which the brushless motor is mounted, and employs the motor of the first embodiment as the brushless motor.

Third Embodiment

As an example of the electric apparatus according to the present disclosure, a configuration of an air conditioner outdoor unit will be described in detail as a third embodiment.

Figure 11:
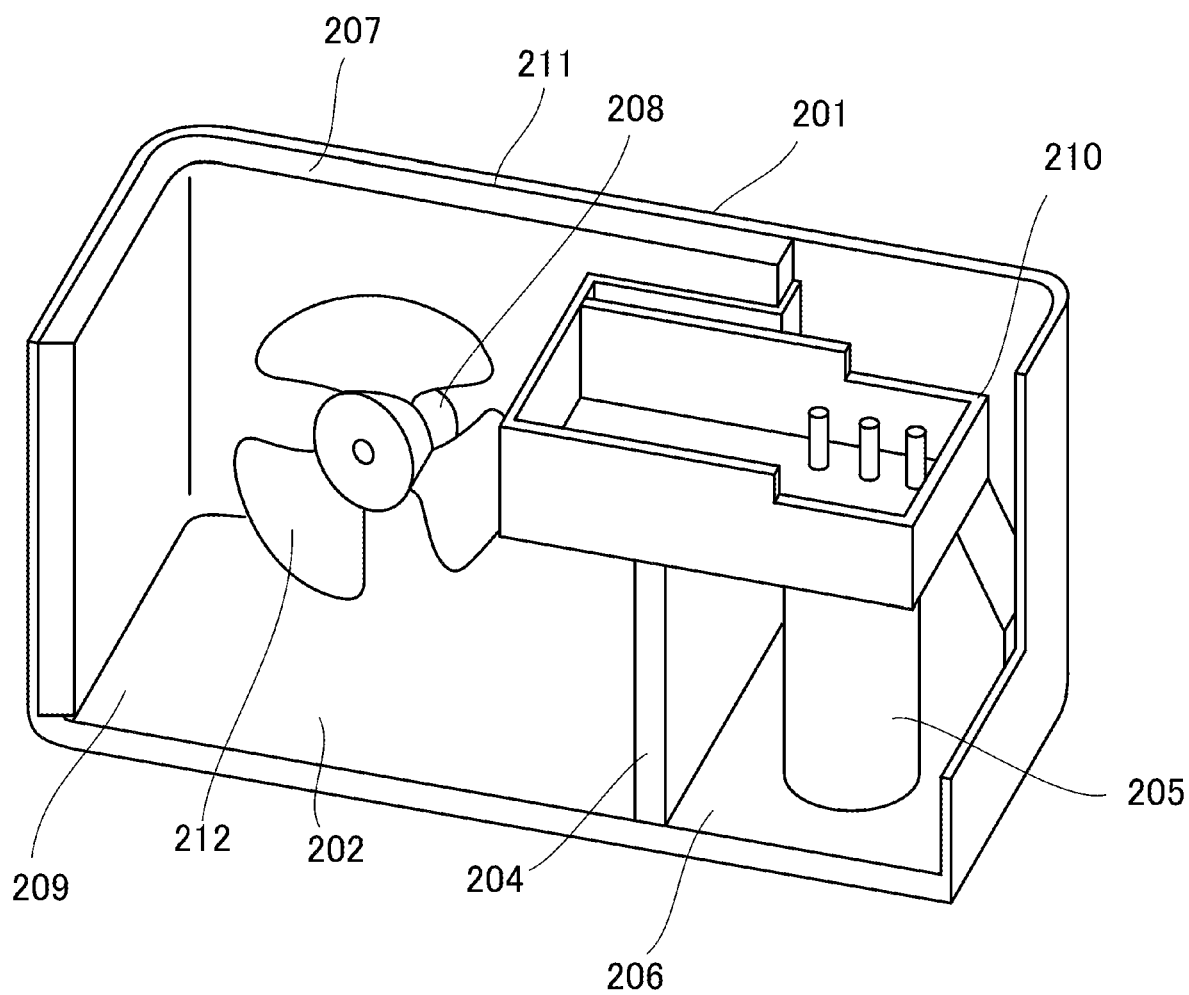
FIG. 11 is a perspective view of an aspect of another electric apparatus using the motor according to the first embodiment.

In FIG. 11, an air conditioner outdoor unit 201 includes a brushless motor 208 inside a housing 211. In the brushless motor 208, a blower fan 212 is attached to a rotation shaft.

The air conditioner outdoor unit 201 is partitioned into a compressor chamber 206 and a heat exchanger chamber 209 by a partition plate 204 erected on a bottom plate 202 of the housing 211. The compressor chamber 206 is provided with a compressor 205. A heat exchanger 207 and the blower fa motor 208 are disposed in the heat exchanger chamber 209. An electric component box 210 is provided above the partition plate 204.

In the blower fa motor 208, the blower fan 212 is rotated in accordance with the rotation of the brushless motor 208 driven by the motor drive device housed in the electric component box 210, and blows air to the heat exchanger chamber 209 through the heat exchanger 207. Here, for example, the motor 50 of the first embodiment described above can be applied to the brushless motor 208.

The electric apparatus of the present disclosure includes the brushless motor 208 and the housing in which the brushless motor 208 is mounted, and employs the motor 50 of the first embodiment as the brushless motor 208.

Fourth Embodiment

As an example of the electric apparatus according to the present disclosure, a configuration of a water heater will be described in detail as a fourth embodiment.

Figure 12:
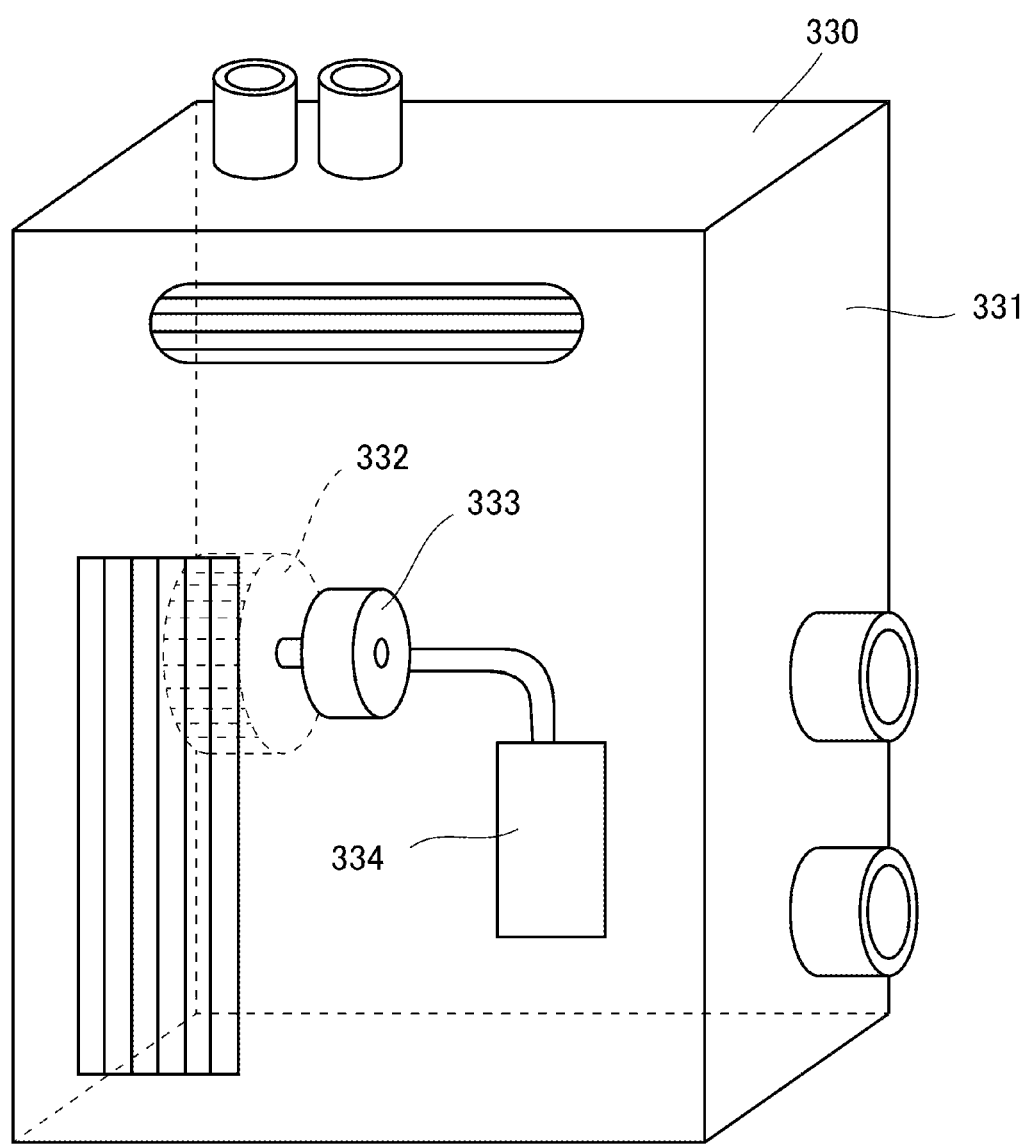
FIG. 12 is a perspective view of an aspect of another electric apparatus using the motor according to the first embodiment.

In FIG. 12, a brushless motor 333 is provided in a housing 331 of a water heater 330. A blower fan 332 is attached to a rotation shaft of the brushless motor 333.

The brushless motor 333 is driven by a motor drive device 334. The brushless motor 333 is rotated by the energization from the motor drive device 334, and the blower fan 332 is rotated accordingly. By the rotation of the blower fan 332, air necessary for combustion is blown to a fuel vaporization chamber (not illustrated). Here, for example, the motor 50 of the first embodiment described above can be applied to the brushless motor 333.

The electric apparatus of the present disclosure includes the brushless motor 333 and the housing in which the brushless motor 333 is mounted, and employs the motor 50 of the first embodiment as the brushless motor 333.

Figure 9:
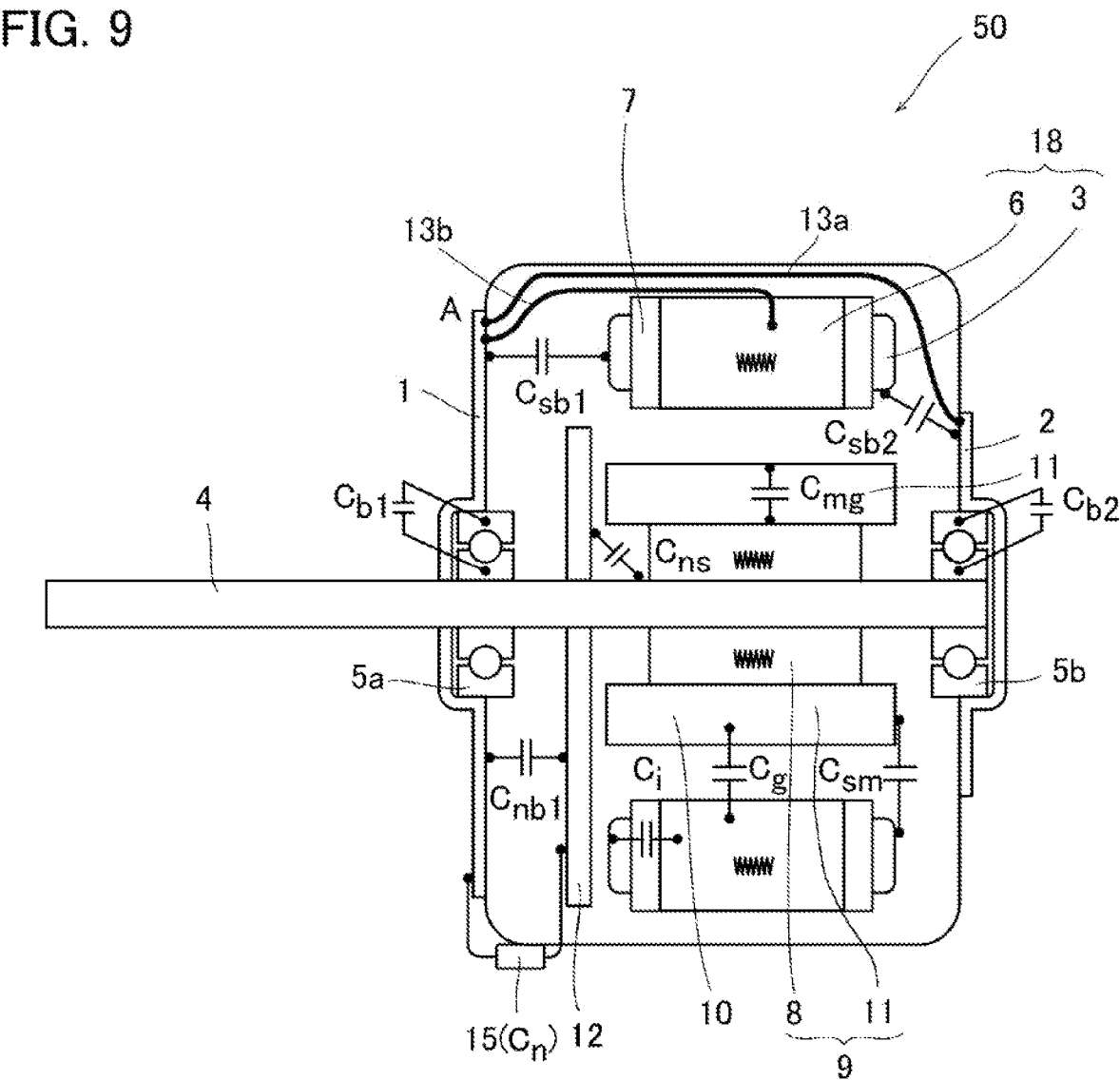
FIG. 9 is a schematic configuration diagram of a section of a motor according to the first embodiment as another aspect of the present disclosure.

In FIG. 1 of the first embodiment, the capacitive member 15 is disposed inside the motor 50, but the capacitive member 15 may be disposed outside the motor 50 through an opening portion (not illustrated) of the motor 50, as illustrated in FIG. 9. The capacitive member 15 may be disposed anywhere outside the motor 50, and is disposed, for example, on an outer wall of the housing of the motor 50. Alternatively, the capacitive member 15 may be provided, for example, at a position away from the motor 50. Thus, the motor 50 can be made more compact.

The aspect of FIG. 9 is not limited to the first embodiment, and is also applicable to the second to fourth embodiments.

In FIG. 1 of the first embodiment, the printed circuit board 12 including the drive circuit is provided inside the motor 50, but the printed circuit board 12 including the drive circuit may be provided outside the motor 50. In this case, the motor 50 can be made compact.

In the second to fourth embodiments, the blower fan is used as a component rotated by the motor 50, but the component is not particularly limited as long as the component is rotated by the motor 50.

Note that the invention according to the first to fourth embodiments can be replaced or combined as long as there is no contradiction.

As described above, the present disclosure includes a motor described in the following items and an electric apparatus including the motor.

Item 1

A motor including:

a stator that includes a stator core and a stator winding wound around the stator core;

a rotor that includes a rotating body and a shaft, the rotating body holding magnets in a circumferential direction of the rotor and facing the stator, or holding magnets in a spoke shape from a center, the shaft penetrating a center of the rotating body;

a first bearing and a second bearing that each support the rotating body;

a first metal bracket and a second metal bracket that respectively fix the first bearing and the second bearing, the first metal bracket and the second metal bracket being electrically connected with the stator core; and a capacitive member that has a capacitance $C_n$, and is arranged between a first portion and a second portion, the first portion included in the motor and having the same potential as a connection point A, the second portion included in the motor and having a zero reference potential of a drive circuit that applies a voltage to the stator core, where the connection point A is defined as a connection point between the stator core and either the first metal bracket or the second metal bracket.

According to the above aspect, the first metal bracket and the second metal bracket are electrically connected with the stator core and the capacitive member 15 mixes the capacitance distribution on the stator 18 side and the capacitance distribution on the rotor 10 side from the separated form via the capacitance of the first bearing 5a and the second bearing 5b. As a result, the potential of the connection point A of the bearing outer ring and the potential of the connection point B of the bearing inner ring are approximated to each other, and in this state, the capacitive member 15 reduces a potential difference between the potential of the connection point A and the potential of the connection point B, so that the shaft voltage can be reduced.

Item 2

The motor according to Item 1, further comprising:

a first conductive member that electrically connects the first metal bracket with the second metal bracket; and a second conductive member that electrically connects the stator core with either the first metal bracket or the second metal bracket.

According to the above aspect, the first conductive member electrically connects the first metal bracket with the second metal bracket and the second conductive member electrically connects the stator core with either the first metal bracket or the second metal bracket. Then the capacitance distribution on the stator 18 side and the capacitance distribution on the rotor 10 side are mixed from the separated form via the capacitance of the first bearing 5a and the second bearing 5b. As a result, the potential of the connection point A of the bearing outer ring and the potential of the connection point B of the bearing inner ring are approximated to each other, and in this state, the capacitive member 15 reduces the potential difference between the potential of the connection point A and the potential of the connection point B, so that the shaft voltage can be reduced.

Item 3

The motor according to Item 1, further comprising:

a first conductive member that electrically connects the stator core with the first metal bracket; and a second conductive member that electrically connects the stator core with the second metal bracket.

According to the above aspect, the first conductive member electrically connects the stator core with the first metal bracket and the second conductive member electrically connects the stator core with the second metal bracket. Then the capacitance distribution on the stator 18 side and the capacitance distribution on the rotor 10 side are mixed from the separated form via the capacitance of the first bearing 5a and the second bearing 5b. As a result, the potential of the connection point A of the bearing outer ring and the potential of the connection point B of the bearing inner ring are approximated to each other, and in this state, the capacitive member 15 reduces the potential difference between the potential of the connection point A and the potential of the connection point B, so that the shaft voltage can be reduced.

Item 4

The motor according to any one of Items 1 to 3, wherein the second portion is insulated from the earth.

According to the above aspect, the shaft voltage can be reduced.

Item 5

The motor according to any one of Items 1 to 4, wherein the capacitance $C_n$ has a value set in such a manner that both a potential difference between a voltage of the connection point A and a voltage of a bearing inner ring of the first bearing, and a potential difference between the voltage of the connection point A and a voltage of a bearing inner ring of the second bearing each have an absolute value of 5 V or less, in a case where a capacitance of the rotor falls within a range of 0.2 pF or more and 2000 pF or less.

According to the above aspect, in a case where a capacitance of the rotor falls within a range of 0.2 pF or more and 2000 pF or less, the capacitive member has the capacitance $C_n$ in which the shaft voltage satisfies an absolute value of 5 V or less.

Item 6

The motor according to any one of Items 1 to 5, wherein the capacitive member is configured to reduce a voltage of the connection point A to reduce a potential difference between the voltage of the connection point A and either a voltage of a bearing inner ring of the first bearing or a bearing inner ring of the second bearing.

According to the above aspect, the stator core 6 is connected with the first metal bracket 1 or the second metal bracket 2. Then the capacitance distribution on the stator 18 side and the capacitance distribution on the rotor 10 side are mixed from the separated form via the capacitance of the first bearing 5a and the second bearing 5b. As a result, the potential of the connection point A of the bearing outer ring and the potential of the connection point B of the bearing inner ring are approximated to each other, and in this state, the capacitive member 15 reduces the voltage of the connection point A and reduces the potential difference between the potential of the connection point A and the potential of the connection point B, so that the shaft voltage can be reduced.

Item 7

The motor according to any one of Items 1 to 6, wherein the capacitive member is located outside a housing formed by the first metal bracket, the second metal bracket and the stator.

According to the above aspect, the motor can be made compact without being restricted by the space of the capacitive member.

Item 8

The motor according to any one of Items 1 to 6, wherein the capacitive member is located inside a housing formed by the first metal bracket, the second metal bracket and the stator.

According to the above aspect, the space outside the motor is not affected.

Item 9

The motor according to any one of Items 1 to 8, wherein a printed circuit board including the drive circuit is located outside a housing formed by the first metal bracket, the second metal bracket and the stator.

According to the above aspect, the motor can be made compact, and the space inside the motor is not affected.

Item 10

The motor according to any one of Items 1 to 8, wherein a printed circuit board including the drive circuit is located inside a housing formed by the first metal bracket, the second metal bracket and the stator.

According to the above aspect, the space outside the motor is not affected.

Item 11

An electric apparatus including the motor according to any one of Items 1 to 10; and a blower fan that is driven by the motor.

According to the above aspect, it is possible to suppress the occurrence of electrolytic corrosion of the bearing of the motor of the electric apparatus including the blower fan.

What is claimed is:

1. A motor comprising:
a stator that includes a stator core and a stator winding wound around the stator core;
a rotor that includes a rotating body and a shaft, the rotating body holding magnets in a circumferential direction of the rotor and facing the stator, or holding magnets in a spoke shape from a center, the shaft penetrating a center of the rotating body;
a first bearing and a second bearing that each support the rotating body;
a first metal bracket and a second metal bracket that respectively fix the first bearing and the second bearing, the first metal bracket and the second metal bracket being electrically connected with the stator core in such a manner that the first metal bracket, the second metal bracket and the stator core have the same potential; and
a capacitive member that has a capacitance $C_n$, and is arranged between a first portion and a second portion, the first portion included in the motor and having the same potential as a connection point A, the second portion included in the motor and having a zero reference potential of a drive circuit that applies a voltage to the stator core, where the connection point A is defined as a connection point between the stator core and either the first metal bracket or the second metal bracket.

2. The motor according to claim 1, further comprising:
a first conductive member that is a wire electrically short-circuiting the first metal bracket with the second metal bracket; and
a second conductive member that is a wire electrically short-circuiting the stator core with either the first metal bracket or the second metal bracket.

3. The motor according to claim 1, further comprising:
a first conductive member that is a wire electrically short-circuiting the stator core with the first metal bracket; and
a second conductive member that is a wire electrically short-circuiting the stator core with the second metal bracket.

4. The motor according to claim 1,
wherein the second portion is insulated from the earth.

5. The motor according to claim 1,
wherein the capacitance $C_n$ has a value set in such a manner that both a potential difference between a voltage of the connection point A and a voltage of a bearing inner ring of the first bearing, and a potential difference between the voltage of the connection point A and a voltage of a bearing inner ring of the second bearing each have an absolute value of 5 V or less, in a case where a capacitance of the rotor falls within a range of 0.2 pF or more and 2000 pF or less.

6. The motor according to claim 1,
wherein the capacitive member is configured to reduce a voltage of the connection point A to reduce a potential difference between the voltage of the connection point A and either a voltage of a bearing inner ring of the first bearing or a bearing inner ring of the second bearing.

7. The motor according to claim 1,
wherein the capacitive member is located outside a housing formed by the first metal bracket, the second metal bracket and the stator.

8. The motor according to claim 1,
wherein the capacitive member is located inside a housing formed by the first metal bracket, the second metal bracket and the stator.

9. The motor according to claim 1,
wherein a printed circuit board including the drive circuit is located outside a housing formed by the first metal bracket, the second metal bracket and the stator.

10. The motor according to claim 1,
wherein a printed circuit board including the drive circuit is located inside a housing formed by the first metal bracket, the second metal bracket and the stator.

11. The motor according to claim 1,
wherein a total capacitance between the connecting point A and the zero reference potential of the drive circuit is a combined capacitance of a capacitance $C_{nb1}$ and the capacitance $C_n$ where $C_{nb1}$ is defined as a capacitance between the first metal bracket and the zero reference potential of the drive circuit.

12. An electric apparatus comprising:
a motor; and
a blower fan that is driven by the motor,
wherein the motor includes:
a stator that includes a stator core and a stator winding wound around the stator core;
a rotor that includes a rotating body and a shaft, the rotating body holding magnets in a circumferential direction of the rotor and facing the stator, or holding magnets in a spoke shape from a center, the shaft penetrating a center of the rotating body;
a first bearing and a second bearing that each support the rotating body;
a first metal bracket and a second metal bracket that respectively fix the first bearing and the second bearing, the first metal bracket and the second metal bracket being electrically connected with the stator core in such a manner that the first metal bracket, the second metal bracket and the stator core have the same potential; and
a capacitive member that has a capacitance $C_n$, and is arranged between a first portion and a second portion, the first portion included in the motor and having the same potential as a connection point A, the second portion included in the motor and having a zero reference potential of a drive circuit that applies a voltage to the stator core, where the connection point A is defined as a connection point between the stator core and either the first metal bracket or the second metal bracket.

* * * * *